(12) United States Patent
Hirasawa

(10) Patent No.: US 8,032,008 B2
(45) Date of Patent: Oct. 4, 2011

(54) CONTENT RECORDING/REPRODUCTION DEVICE, CONTENT RECORDING/REPRODUCTION METHOD, INFORMATION PROCESSING DEVICE, AND CONTENT RECORDING/REPRODUCTION SYSTEM

(75) Inventor: Tsutomu Hirasawa, Saitama (JP)

(73) Assignee: Sony Corporation, Tokyo (JP)

( * ) Notice: Subject to any disclaimer, the term of this patent is extended or adjusted under 35 U.S.C. 154(b) by 1803 days.

(21) Appl. No.: 10/544,648

(22) PCT Filed: Dec. 24, 2004

(86) PCT No.: PCT/JP2004/019416
§ 371 (c)(1),
(2), (4) Date: Aug. 5, 2005

(87) PCT Pub. No.: WO2005/064476
PCT Pub. Date: Jul. 14, 2005

(65) Prior Publication Data
US 2006/0153031 A1 Jul. 13, 2006

(30) Foreign Application Priority Data
Dec. 25, 2003 (JP) .................................. 2003-430730

(51) Int. Cl.
*H04N 5/93* (2006.01)
(52) U.S. Cl. ........................................ 386/278; 386/252
(58) Field of Classification Search ................ 386/1, 46, 386/52–55, 95; 713/189–194
See application file for complete search history.

(56) References Cited

U.S. PATENT DOCUMENTS 7,099,559 B1 * 8/2006 Niikawa et al. ................ 386/252
7,159,244 B2 * 1/2007 Matsushima et al. ........... 726/30
7,295,230 B2 * 11/2007 Takahashi et al. .......... 348/231.1
(Continued)

FOREIGN PATENT DOCUMENTS
JP 2000-315177 11/2000
(Continued)

OTHER PUBLICATIONS

Office Action issued Sep. 14, 2010, in Japan Patent Application No. 2005-516662.

*Primary Examiner* — David Harvey
(74) *Attorney, Agent, or Firm* — Oblon, Spivak, McClelland, Maier & Neustadt, L.L.P.

(57) ABSTRACT

There is provided a content recording/reproducing apparatus that can restore a deleted content. An MD recording player (1) as an example of the content recording/reproducing apparatus records, each time a content recorded in a mini disk (90) is deleted, information on the deleted content to a deletion history. Since a personal computer (200) as an external device re-records the content deleted in the MD recording player (1) on the basis of the content of the deletion history, so the user has not to re-record the deleted content by remembering what the deleted content was. Also, even if a content checked out to the MD recording player (1) is deleted, the number of times of check-in or check-out is matched with the content data by making deemed check-in on the basis of the deletion history or recording history. Thus, even if checked-out content data is deleted at the check-out destination, a limited number of times of check-out can be assured so that it is possible to prevent the content data from becoming unusable.

11 Claims, 21 Drawing Sheets

U.S. PATENT DOCUMENTS

| | | | |
|---|---|---|---|
| 7,369,750 B2 * | 5/2008 | Cheng et al. | 386/292 |
| 2001/0026287 A1 * | 10/2001 | Watanabe | 345/764 |
| 2002/0078439 A1 * | 6/2002 | Yamaga | 725/1 |
| 2003/0108328 A1 * | 6/2003 | Kawasaki et al. | 386/46 |
| 2003/0110190 A1 * | 6/2003 | Achiwa et al. | 707/203 |
| 2004/0028385 A1 * | 2/2004 | Kori et al. | 386/94 |
| 2004/0141723 A1 * | 7/2004 | Sakano | 386/52 |
| 2004/0210628 A1 * | 10/2004 | Inkinen et al. | 709/201 |
| 2007/0016618 A1 * | 1/2007 | Robert et al. | 707/200 |

FOREIGN PATENT DOCUMENTS

| | | |
|---|---|---|
| JP | 2003-186754 | 7/2003 |

* cited by examiner

CONTENT RECORDING/REPRODUCTION DEVICE, CONTENT RECORDING/REPRODUCTION METHOD, INFORMATION PROCESSING DEVICE, AND CONTENT RECORDING/REPRODUCTION SYSTEM

TECHNICAL FIELD

The present invention relates to a content recording/reproducing apparatus and method, for restoring a deleted content restored, and a content recording/reproducing system which records a stored content to an external unit and recording medium.

This application claims the priority of the Japanese Patent Application No. 2003430730 filed on Dec. 25, 2003, the entirety of which is incorporated by reference herein.

BACKGROUND ART

The recording media such as optical recording medium, semiconductor memory, magnetic recording medium and the like can store various kinds of information such as music content, video content, text, etc. Thus, if there is available an apparatus capable of recording and reproducing data different in format from each other, the user of the apparatus can record or reproduce a music content to or from one of such recording media he or she carries with him, while recording video data captured using a digital camera or the like to the recording medium.

Since it is of course that such a recording medium is limited in capacity, so the user cannot record all new acquired information to the recording medium. When the remaining recording capacity of the recording medium becomes small, the user should delete old information recorded in the recording medium in order to have, in the recording medium, a recording area for such new information or should give up additionally recording the new information if he cannot have any recording area in the recording medium.

Once information has been deleted from the recording medium, however, if the recording/reproducing apparatus can be connected to any external device such as a personal computer or the like, for example, the user has to re-acquire the information once deleted by remembering what the information was and searching in the external device thus connected to the recording/reproducing apparatus.

Recently, a content managing method called "check-out and check-in" is used as an example of the copyright protection technology. Different from a content managing method in which a content is simply copied between recording media or between apparatuses, this "checkout and check-in" method is to move and copy a content between recording media or apparatuses or permit the right of using the content within a range of predetermined conditions. For example, in this copyright protection technology, it is defined that a content recorded in one apparatus may be brought out from the apparatus to another apparatus or a recording medium a predetermined number of times and used until the predetermined number of times is counted up. In some cases, the copyright protection technology is applied such that a content for which the right of use is checked out from one apparatus (this is called "check-out") may be used in a destination apparatus or recording medium, while it may not be used in the one apparatus until the right of use is returned (this is called "check in"). Also, there has been proposed a technology in which when a counted number of times of check-out exceeds a limited number of times, it is inhibited to copy a content any more (cf. Japanese Patent No. 2000-315177).

The user having purchased a content whose copyright is thus protected should be able to use the content by checking it out to another apparatus unless the above-mentioned limited number of times is counted up. In the above case, namely, when a new content has to be recorded and any old content has to be deleted, if a content checked out from a host apparatus such as a personal computer or the like is deleted in a destination apparatus, the content cannot be checked in and the number of times of check-out will remain as it is when the host apparatus is next put in connection. In such a case, if the number of times of check-out exceeds the limited number of times, the deleted content will not be usable at the recording/reproducing apparatus. Also, the checked-out content cannot be used at the host apparatus or cannot be checked out again to another apparatus.

DISCLOSURE OF THE INVENTION

Accordingly, the present invention has an object to overcome the above-mentioned drawbacks of the related art by providing a content recording/reproducing apparatus and method and a content recording/reproducing system, for restoring even content data whose move and copy between apparatuses or recording media are managed for use under the protection of the copyright for the content data.

The above object can be attained by providing a content recording/reproducing apparatus for recording and/or reproducing content data including audio data, video data or computer data to and/or from a recording medium having a recording area in which main data is to be recorded and a management area in which data for managing the main data is to be recorded, the apparatus including, according to the present invention, a recording/reproducing means for recording content data to the recording medium or reproducing content data recorded in the recording medium; an operating means to be operated by the user of the apparatus for recording or reproducing the content data to or from the recording medium; an editing means for editing, by deletion, copying and reordering, information recorded in the recording area where the main data is recorded and the management area where the managing data is recorded in response to a command supplied from the operating means; an deletion history generating means for generating deletion history information on the basis of information on the content data when the content data is deleted; and a controlling means for controlling the deletion history generating means to generate deletion history information when the content data recorded in the recording medium with a command from the operating means is deleted and record the deletion history information to the recording medium.

The above apparatus also includes a connecting means for transferring the content data. When the connecting means is connectable to an external information processor including a storing means for storing the content data, the controlling means transmits the deletion history information recorded in the recording medium to the information processor when the connecting means is connected to the information processor. In case the deleted content data is data supplied from the information processor, it will be supplied provided again.

The above apparatus may further include a video data acquiring means for acquiring video data. When the video data acquiring means acquires visual data, the controlling means deletes a part of the content data correspondingly to the recording capacity of the recording medium to assure a recording capacity and controls the deletion history generating means to generate deletion history information and record it to the recording medium.

Also the above object can be attained by providing an information processor including a storing means for storing content data and which is connected to an external device capable of recording and reproducing a recording medium loaded therein to transmit the content data to the external device, the apparatus, including according to the present invention, a recording history generating means for generating recording history information on the basis of information on the content data read by the external device when the content data is read by the external device from the storing means; and a controlling means for making a comparison between the content data stored in the recording medium the external device can record and reproduce when the apparatus is connected to the external device and the recording history information and retransmitting the deleted content data.

Also the above object can be attained by providing a content recording/reproducing system including an information processor that can store content data and a content recording/reproducing apparatus connected to the information processor to read content data from the storing means of the information processor to a recording medium or transmit content data recorded in the recording medium to the storing means of the information processor. The content recording/reproducing apparatus includes a recording/reproducing means for recording content data to the recording medium having a recording area in which main data is to be recorded and a management area in which data for managing the main data is to be recorded or reproducing content data recorded in the recording medium; an operating means to be operated by the user of the apparatus for recording or reproducing the content data to or from the recording medium; an editing means for editing, by deletion, copying and reordering, information recorded in the recording area where the main data is recorded and the management area where the managing data is recorded in response to a command supplied from the operating means; an deletion history generating means for generating deletion history information on the basis of information on the content data when the content data is deleted; and a controlling means for controlling the deletion history generating means to generate deletion history information when the content data recorded in the recording medium with a command from the operating means is deleted and record the deletion history information to the recording medium. When the information processor has the content recording/reproducing apparatus connected thereto, it acquires deletion history information generated in the recording medium by the content recording/reproducing apparatus and re-transmits a deleted content on the basis of the deletion history information, so that the information processor will restore the deleted content on the basis of the deletion history information generated by the content recording/reproducing apparatus.

Also the above object can be attained by providing a content recording/reproducing system including an information processor that can store content data and a content recording/reproducing apparatus connected to the information processor to read content data from the storing means of the information processor and record it to a recording medium or transmit content data recorded in the recording medium to the storing means of the information processor. The content recording/reproducing apparatus includes a recording/reproducing means for recording content data to the recording medium having a recording area in which main data is to be recorded and a management area in which data for managing the main data is to be recorded or reproducing content data recorded in the recording medium; an operating means to be operated by the user of the apparatus for recording or reproducing the content data to or from the recording medium; and an editing means for editing, by deletion, copying and reordering, information recorded in the recording area where the main data is recorded and the management area where the managing data is recorded in response to a command supplied from the operating means. The information processor also includes a recording history generating means for generating, when the content recording/reproducing apparatus reads content data, recording history information on the basis of information on the content data read by the content recording/reproducing apparatus. When the content recording/reproducing apparatus is connected to the information processor, it makes a comparison between the content data recorded in the recording medium and recording history information and requests the information processor for the deleted content data, to thereby restore the deleted content data.

Also the above object can be attained by providing a content recording/reproducing method of recording and/or reproducing content data including audio data, video data or computer data to and/or from a recording medium having a recording area in which main data is to be recorded and a management area in which data for managing the main data is to be recorded, the method including, according to the present invention, the steps of generating deletion history information on the basis of information on content data when the content data is deleted in response to a recording or reproduction command given by the user via an operating means; and recording the generated deletion history information to the recording medium.

Also the above object can be attained by providing a content recording/reproducing method of recording and/or reproducing content data in an information processor including a storing means for storing content data and which is connected to an external device capable of recording and reproducing a recording medium loaded therein to transmit the content data to the external device, the method including, according to the present invention, the steps of generating recording history information on the basis of information on the content data read by the external device when the content data is read by the external device from the storing means; and making a comparison between the content data stored in the recording medium the external device can record and reproduce when the apparatus is connected to the external device and the recording history information and retransmitting the deleted content data.

Also the above object can be attained by providing a content recording/reproducing method of recording and/or reproducing content data in a content recording/reproducing system including an information processor that can store content data and a content recording/reproducing apparatus connected to the information processor to read content data from the storing means of the information processor and record it to a recording medium or transmit content data recorded in the recording medium to the storing means of the information processor, the method including, according to the present invention, the steps of generating deletion history information on the basis of information on content data when the content data is deleted in response to a recording or reproduction command given by the user via an operating means; recording the generated deletion history information to the recording medium; and acquiring the deletion history information generated in the recording medium when the information processor and content recording/reproducing apparatus are connected to each other and retransmitting the deleted content data on the basis of the deletion history information.

Also the above object can be attained by providing a content recording/reproducing method of recording/reproducing content data in a content recording/reproducing system including an information processor that can store content data and a content recording/reproducing apparatus connected to the information processor to read content data from the storing means of the information processor and record it to a recording medium or transmit content data recorded in the recording medium to the storing means of the information processor, the method including, according to the present invention, the steps of generating, when the content recording/reproducing apparatus reads content data from the information processor, recording history information on the basis of information on the content data read by the content recording/reproducing apparatus; and making a comparison, when the content recording/reproducing apparatus is connected to the information processor, between the content data recorded in the recording medium and recording history information and requesting the information processor for the deleted content data.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described below concerning the embodiment thereof with reference to the accompanying drawings. The embodiment is an application of the present invention to a content recording/reproducing apparatus capable of recording and/or reproducing content data including audio data, video data, computer data (will be referred to as "PC data" hereunder) or the like to and/or from a disk-shaped magneto-optical recording medium which is a Mini Disk (MD; registered trademark) by way of example.

Figure 1:
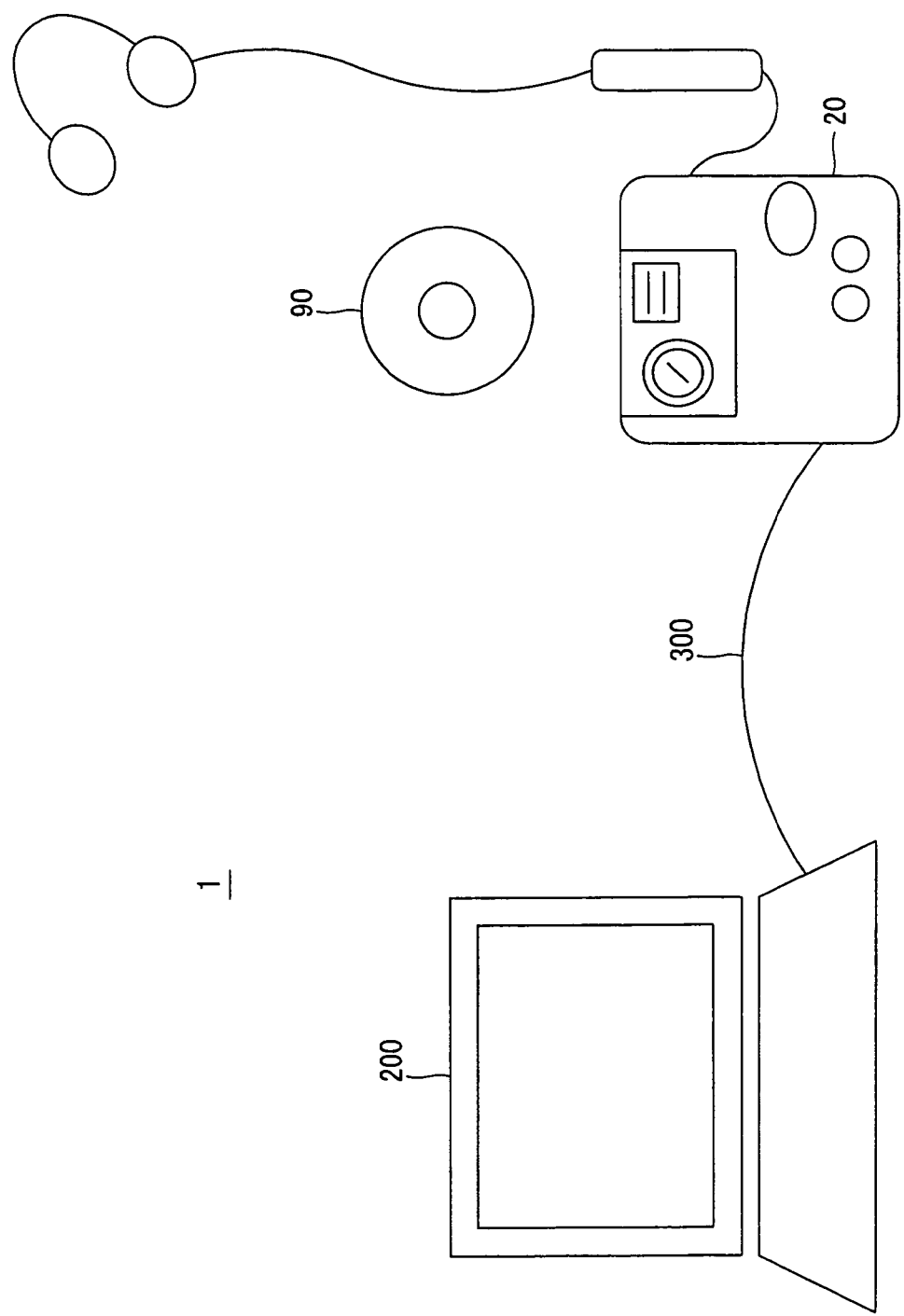
FIG. 1 schematically illustrates a system including an MD recording player and a personal computer (PC), as a first embodiment of the present invention.

The content recording/reproducing apparatus shown in FIG. 1, generally indicated with a reference numeral 1, has a configuration as a digital camera and a function as an audio recording/reproducing apparatus. It can write or read video data acquired with the digital camera function to or from the MD, and write or read audio data to or from the MD. Therefore, the content recording/reproducing apparatus will be explained as am MD recording player.

As shown in FIG. 1, the MD recording player 1 is connectable to an external device such as a personal computer (will be referred to as "PC" hereunder) 200 or the like with a connecting interface such as a USB (universal serial bus) 300 or the like. It can transfer content data including audio data, video data, PC data or the like to or from the PC 200. Therefore, the MD recording player 1 can read content data stored in an HDD (hard disk drive) in the PC 200 working as a host to the MD 90 and reproduce it from the MD 90. Also, since the MD 90 can record PC data as well, the MD recording player 1 is usable as an external recorder for the PC 200.

The MD 90 playable in the MD recording player 1 can record data different in format from each other, such as audio data, video data, PC data, etc. It has a concealing area that is usable only with an authentication and a normal recording area that is usable without any authentication. In the concealing area, there can be recorded only specific data such as a copyright-protected music content, video content, etc. In this embodiment, audio data coded by ATRAC (adaptive transform acoustic coding; registered trademark), ATRAC3 or ATRAC3plus (family of the ATRAC) is treated as specific data recordable to the concealing area. On the other hand, audio data, video data, text data or the like coded by other coding technique such as MP3 (MPEG1 Audio Layer-3), WMA (Windows; registered trademark), Media Audio or the like than the ATRAC family is recorded to the normal recording area.

Here, the MD 90 usable with the MD recording player 1 will be explained.

As the MD 90 usable herein, there are available a type in which the conventional modulation method is adapted for the magneto-optical recording and a new type in which the concealment is improved and the capacity of recording is increased by adopting a different signal recording method from the recording format normally used for write to and read from the MD using the conventional magneto-optical recording method. Using the high-density recording technology and new filing system, the new-type MD has an increased recording capacity while maintaining the similarity in casing profile and recording/reproducing optical system to the conventional MD.

The technical specifications of the MD 90 will be explained below. The explanation of the MD specifications will begin with the conventional MD.

The physical format of the conventional Mini Disk (and MD-DATA) is defined as follows. The track pitch is 1.6 µm and bit length is 0.59 µm/bit. The wavelength λ of the laser used with the conventional MD is λ=780 nm and numerical aperture (NA) of the optical head is NA=0.45. The groove recording is used in which data is written to or read from a groove in the disk surface. For addressing, a single-spiral groove is formed on the disk surface and wobbled as address information to the right and left (wobbled groove). It should be noted that an absolute address recorded as a wobble is also called ADIP (address in pregroove) herein. The conventional MD adopts EFM (8-14 modulation) for modulation data to be recorded. Also, ACIRC (advanced cross interleave Reed-Solomon code) is used for error correction. The convolution is employed for interleaving data. Thus, the data redundancy is 46.3%. Also, the data is detected bit by bit in the conventional MD, and the disk is driven under the CLV (constant linear velocity) control. The linear speed under the CLV control is 1.2 n/s. The standard data rate for data write or read is 133 kB/s, and recording capacity is 164 MB (140 Mb with MD-DATA). Also, the minimum unit for data rewriting is composed of 36 sectors including 32 main sectors and 4 link sectors.

On the other hand, of the Mini Disks 90, the new type in which the capacity of recording is increased by modifying the modulation method in the conventional magneto-optical recording system (will be referred to as "first next-generation MD" hereunder wherever appropriate) is the same in physical specifications of recording medium as the aforementioned MD. Namely, the track pitch is 1.6 µm, wavelength λ of the laser is λ<=780 nm, and numerical aperture (NA) of the optical head is NA=0.45. The groove recording is used in which data is written to or read from a groove in the disk surface. For addressing, the ADIP is used. Since the configuration of the optical system, ADIP address reading and servo control in the disk drive unit are similar to those of the conventional MD, so the MD 90 is interchangeable with the conventional MD. Also, the MD 90 adopts the RLL (1-7) PP (RLL: runlength limited; PP: parity preserve/prohibit rmtr (repeated minimum transition runlength), which is suitable for the high-density recording, for modulation of data to be recorded. Also, for error correction, there is adopted the RS-LDC (Reed Solomon-long distance code) with the BIS (burst indicator subcode), featured by a high ability of error correction. Data are interleaved in each block. Thus, the data redundancy is 20.50%. Also, the data is detected by the Viterbi decoding with PR (1, 2, 1) ML.

With the MD 90, the CLV control is used in the disk drive. The linear velocity under the CLV control is 2.4 m/s. The standard data rate for data write or read is 4.4 MB/s. With adoption of these specifications, the total capacity of recording can be made 300 MB. With the RLL (1-7) PP modulation adopted in place of EFM, the window margin is changed from 0.5 to 0.666, and so data can be recorded with a density 1.33 times higher. Also, the minimum unit for data rewriting is composed of 16 sectors (64 kB). Because of the adoption of the RS-LDC with BIS in place of the CIRC for modulating data to be recorded, difference in sector structure from in the conventional MD and adoption of the Viterbi decoding, recording modulation, the data efficiency can be increased from 53.7% to 79.5% and so data can be recorded with a density 1.48 times higher. With these factors taken together, the recording capacity of 300 MB can be attained, which is about 2 times of that of the conventional MD.

Also, the aforementioned new type in which the concealment is improved and the capacity of recording is increased by adopting a different signal recording method from the recording format normally used for write to and read from the MD using the conventional magneto-optical recording method (will be referred to as "second next-generation MD" hereunder wherever appropriate) is a recording medium to which the high-density recording technology such as DWDD (domain wall displacement detection), for example, is applied. The MD of this type is different in physical format from the conventional MD.

In this new-type MD, the track pitch is 1.25 µm and bit length is 0.16 m. That is, this MD can record data with a higher density in a linear direction. Also, for interchangeability with the conventional MD, the optical system, reading method, servo control, etc. comply with the provisions in the conventional standard so that the wavelength λ of the laser is λ=780 nm, and numerical aperture (NA) of the optical head is NA=0.45. The groove recording is used for data recording, and the ADIP is used for addressing. Also, the housing contour complies with the same standard as that applied to the conventional MD. For detecting a narrower track pitch and linear density (bit length) than in the conventional MD, however, it is necessary to solve the restrictions such as detracking margin, crosstalk from the land and groove, crosstalk from the wobble, missing focusing, CT signal, etc. On this account, the MD 90 of this new type is modified in depth, inclination, width and the like of the groove. More specifically, the groove is 160 to 180 nm, inclined 60 to 70 deg. and 600 to 800 nm wide.

Furthermore, the new-type MD adopts, the RLL (1-7) PP (RLL: runlength limited; PP: parity preserve/prohibit rmtr (repeated minimum transition runlength), which is suitable for the high-density recording, for modulation of data to be recorded. Also, for error correction, the MD adopts the RS-LDC (Reed Solomon-long distance code) with the BIS (burst indicator subcode), featured by a high ability of error correction. Data are interleaved in each block. Thus, the data redundancy is 20.50%. Also, the data is detected by the Viterbi decoding with PR (1, −1) ML. Also, the minimum unit for data rewriting is composed of 16 sectors (64 kB).

For this new-type MD, the ZCAV (zoned constant angular velocity) control is used to control the velocity of disk rotation and the linear velocity if 2.0 m/s. The standard data rate for data write and read is 9.8 MB/s. Adoption of the DWDD and this drive control for this MD permits data recording with a capacity of about 1 GB in total.

Figure 3:
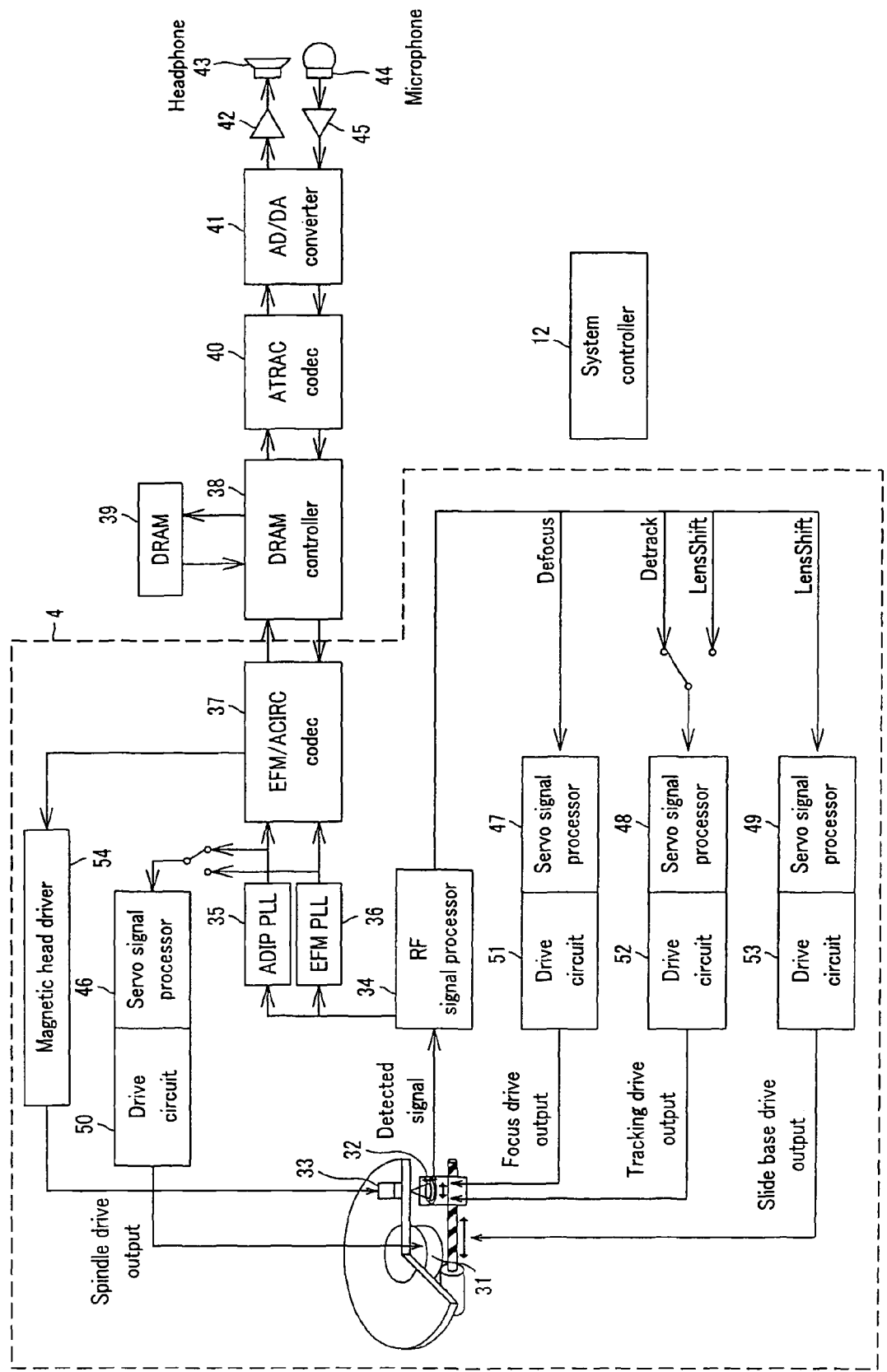
FIG. 3 is a block diagram of a media drive in the MD recording player.
Figure 4:
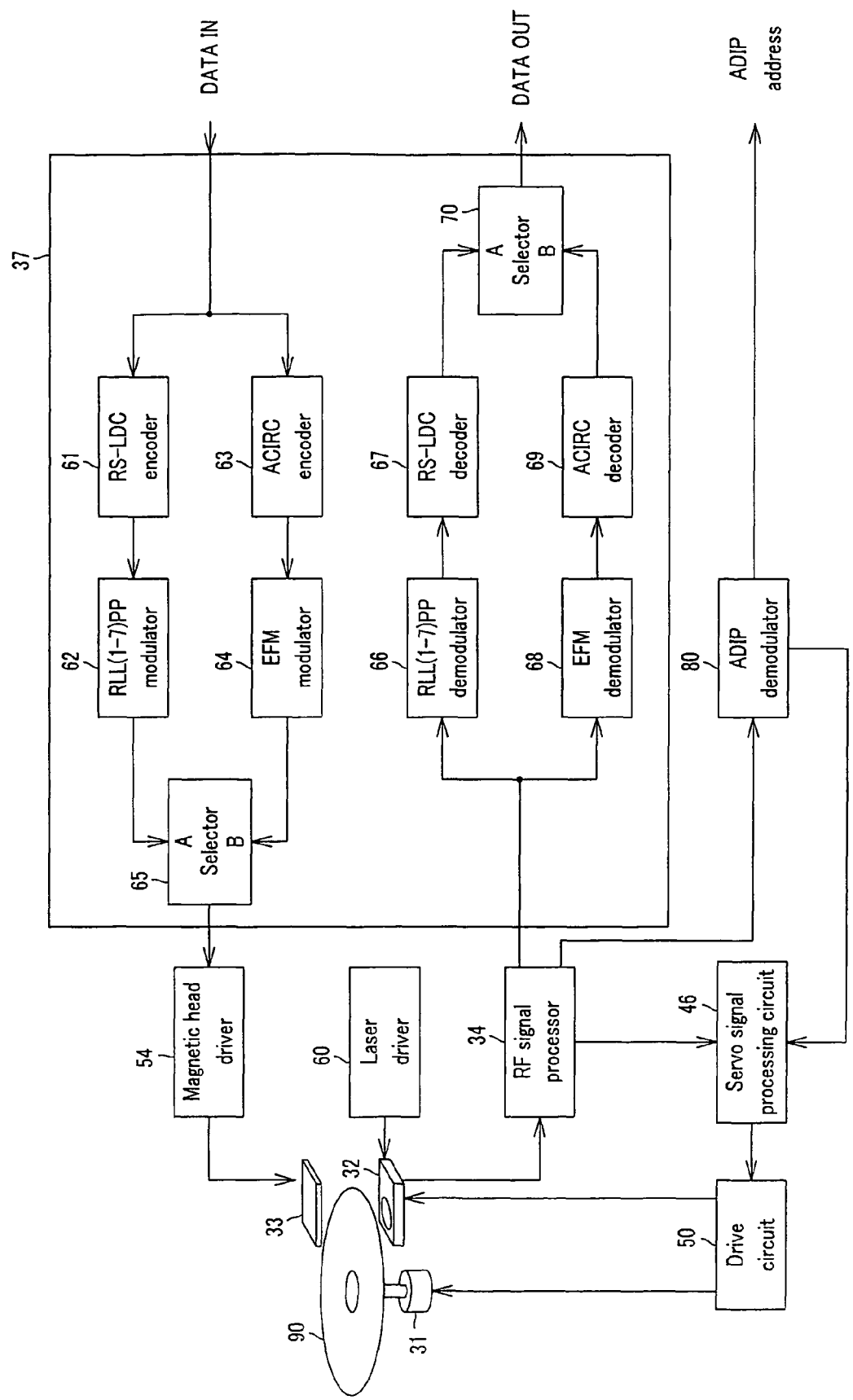
FIG. 4 is a block diagram of and EFM/ACIRC codec as a storage unit in the MD recording player.

The MD recording player 1 as the embodiment of the present invention is internally constructed as will be described below with reference to FIGS. 2 to 4. For compatibility with the above-mentioned types of the MD 90, the MD recording player 1 shown in FIG. 2 includes a coder decoder (will be referred to as "codec" hereunder) shown in detail in FIG. 4 as a write/read unit 4. FIG. 4 shows in detail the codec in the MD recording player 1 shown in FIG. 3.

Using the MD 90 as a recording medium, the MD recording player 1 and can treat various kinds of content data generated in different formats, such as audio data, still-picture data, moving-picture data, text data, PC data, etc. The MD recording player 1 can reproduce content data different in format from each other at the same time. For example, it reproduces audio data while reproducing still-picture data or moving-picture data at a display unit.

The MD 90 will be explained herebelow. For each recording medium, an ID code is recorded as unique identification information to a predetermined area not accessible during normal data reproduction. Depending upon the type of the recording medium, the ID code is arbitrarily generated and recorded as erasable information in the recorder or is recorded in a state in which no data can be written over the ID code at the time of shipping from the factory.

Figure 2:
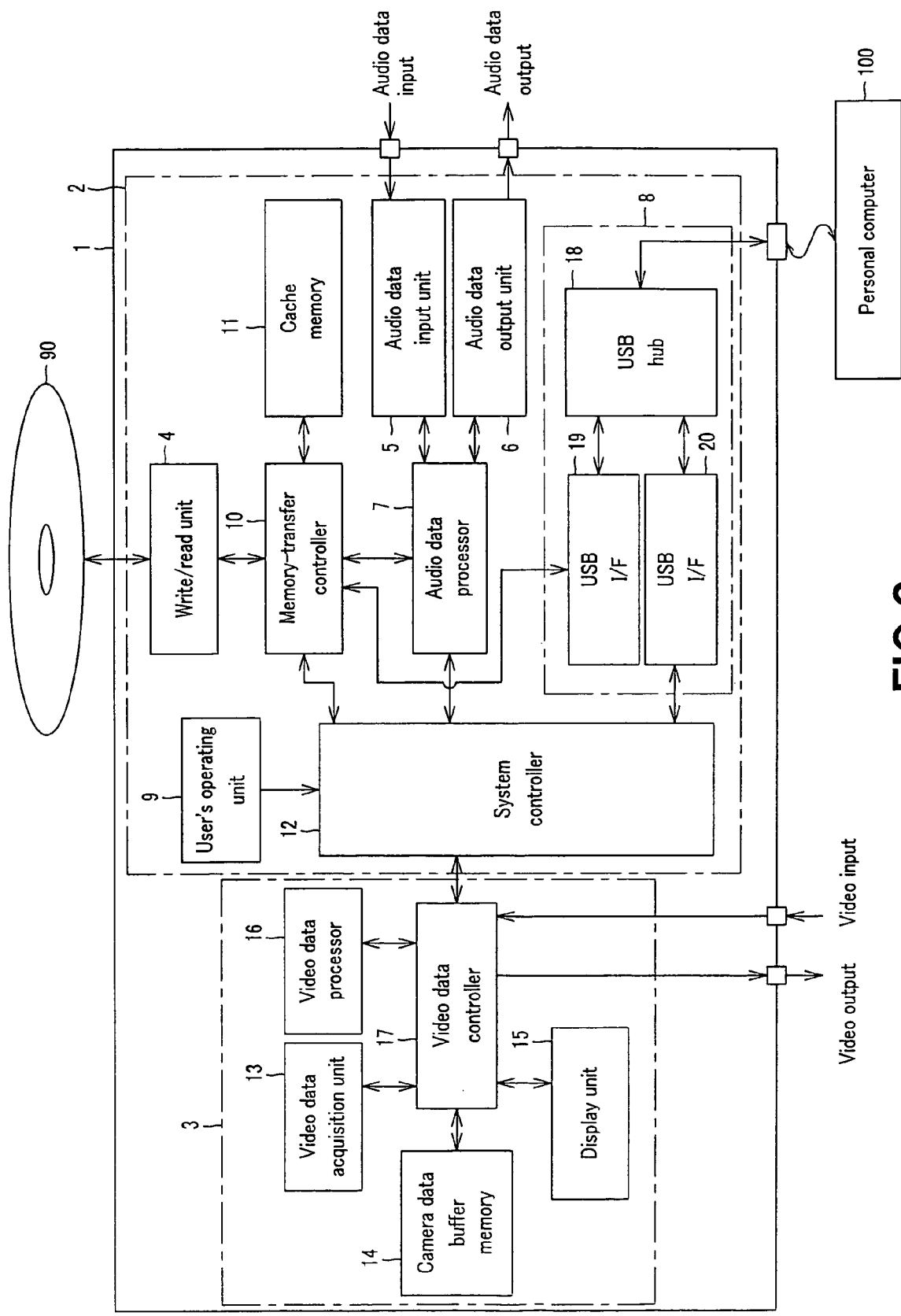
FIG. 2 is a schematic block diagram of an MD recording player as a second embodiment of the present invention.

As shown in FIG. 2, the MD recording player 1 includes a data write/read controller 2 and video processor 3. The data write/read controller 2 includes a write/read unit 4 to write or read data to the MD 90, audio data input unit 5 to receive audio data, audio data output unit 6 to provide audio data to outside, audio data processor 7 to make a predetermined compression and expansion of the audio data, external interface unit 8 to receive and send data from and to an information processor, user's operating unit 9, memory-transfer controller 10, cache memory 11 as an auxiliary memory, and a system controller 12.

The video processor 3 includes a video data acquisition unit 13 formed from a CCD (charge-coupled device), lens and others, camera data buffer memory 14 to provisionally store the video data acquired, display unit 15 using a liquid crystal display (LCD), video data processor 16 to make a predetermined compression and expansion of the video data, and a video data controller 17 to control the video data processor 3.

Also, the external interface unit 8 of the MD recording player 1 includes a USB hub 18 and USB interfaces 19 and 20 as external interfaces for the data write/read controller 2. The MD recording player 1 can thus be connected to a personal computer (will be referred to as "PC" hereunder) 200 by the external interface unit 8.

Being constructed as above and using the MD 90 to which various kinds of content data different in format from each other can be recorded, the MD recording player 1 can record audio data, and acquire video data and record it to the MD 90. Also, since the MD recording player 1 is connectable to an information processor such as PC via the external interface 8, it can be used as an external storage for the information processor.

Each of the components of the MD recording player 1 shown in FIG. 2 will be described in detail below. The memory-transfer controller 10 in the MD recording player 1 controls transfer of one read, by the write/read 4, of a plurality of content data different in format from each other, recorded in the MD 90, or data to be supplied to the write/read unit 4.

The cache memory 11 provisionally stores, under the control of the memory-transfer controller 10, data read by the write/read unit 4 in units of a high-density data cluster from the data track on the MD 90. The cache memory 11 stores, under the control of the memory-transfer controller 10, various kinds of management information such as UTOC data read from the MD 90 by the write/read unit 4, copyright-projection information recorded in the concealing area, information for checking data falsification, external device information for allowing limited access, etc.

The above-mentioned related data include various kinds of management information such as address information indicative of a location in the MD 90 where the substance of given content data is recorded, tag information indicative of the kind of content data, UTOC data, etc., and copyright protection information recorded in the concealing area, data-falsification checking information, information for allowing limited access, etc. For example, data related to audio data include information for identification of the substance of the audio data or for complimenting the audio data, such as the title of a piece of music, name of the composer of the music, time information indicative of the length of the piece of music, etc. Also, data related to video data include information for identification of the substance of the video data or complementing the video data, such as a picture number, date of acquisition, picture frame size, data amount, etc. In this embodiment, the related data will be called "system information", and more particularly, data related to all content data recorded in the MD will be called "common system information", data related to audio data will be called "audio system information" and data related to video data will be called "video system information".

For example, when the MD 90 is set in the write/read unit 4, for example, the system controller 12 will control the write/read unit 4 to read management information etc. from the management information recording area in the MD 90, and the memory-transfer controller 10 to store the read management information such as PTOC, UTOC, etc. into the cache memory 11. Also, the system controller 12 detects the state of recording on the track of the MD 90 by reading the management information. The system controller 12 can communicate with the PC 200 connected thereto via the USB interface 20 and USB bus 18. The system controller 12 receives a command such as a write request, read request or the like from the PC 200 and sends status information and other necessary information to the PC 200 by controlling the communication with the PC 200.

Receiving an FAT sector reading request from the PC 200, the system controller 12 supplies the write/read unit 4 with a control signal for reading a data cluster including the FAT sector which it is requested to read. The data cluster read by the write/read unit 4 is written by the memory-transfer controller 10 into the cache memory 11. In case the data in the FAT sector is already stored in the cache memory 11, however, the write/read unit 4 has not to read it. In this case, the system controller 12 will provide the write/read unit 4 with a control signal for reading the data in the requested-to-read FAT sector from the data in a high-density data cluster written in the cache memory 11 to send the data in the FAT sector to the PC 200 via the USB interface 20 and USB hub 18.

Also, receiving an FAT writing request from the PC 200, the system controller 12 controls the write/read unit 4 to read a data cluster including an FAT sector which it is requested to write. The data cluster thus read is written by the memory-transfer controller 10 to the cache memory 11. In case the data in the FAT sector is already stored in the cache memory 11, however, the write/read unit 4 has not to read it. Also, the system controller 12 supplies to-be-recorded data in the FAT sector sent from the PC 200 to the memory-transfer controller 10 via the USB interface 20 to have the memory-transfer controller 10 rewrite the data in the FAT sector in the cache memory 11. Further, the system controller 12 instructs the memory-transfer controller 10 to transfer the data from the data cluster stored having the necessary FAT sector thereof rewritten in the cache memory 11 to the write/read unit 4. Then, the write/read unit 4 will modulate the data recorded in the data cluster by a modulating method compatible with the MD being loaded and write the modulated data to the MD.

Note that the aforementioned data write and read are controlled for writing or reading audio data to or from the data track and the data is transferred via the audio data processor 7 for writing a or reading audio data which is to be written to or read from the audio track on the MD.

Also, video data acquired by the video data acquisition unit 13 is recorded to the MD 90 via the video data controller 17 and system controller 12. The video data recorded to the MD 90 is compressed by a predetermined video coding in the video data processor 16. The video data read from the MD 90 is reproduced in the display unit 15. The video data read from the MD 90 is decoded and decompressed in the video data processor 16. Also, the MD recording player 1 may be provided with an input terminal at which video data is supplied to the video data controller 17 and an output terminal at which video data is delivered to outside.

In the MD recording player 1, the audio data input unit 5 as an input system for the audio data processor 7 includes, for example, an analog audio signal input section incorporating a line input circuit/microphone input circuit etc, A-D converter, and a digital audio data input section. Also, the audio data processor 19 includes an ATRAC compressed data encoder/decoder (codec) and a compressed-data buffer memory. Further, the audio output unit 6 as an output system for the audio data processor 7 includes, for example, a digital audio data output section, D-A converter, and an analog audio signal output section incorporating a line output circuit/headphone output circuit etc.

Along a first route along which an audio track is written to the MD 90 as a recording medium, digital audio data is supplied to the audio data processor 7 or a digital audio signal resulted from conversion of an analog audio signal in the A-D converter in the audio data input unit 5 is supplied to the audio data processor 7. Supplied linear PCM digital audio data or linear PCM audio data resulted from conversion of the analog audio signal in the A-D converter is ATRAC-compressed by coding and stored in the cache memory 11. Thereafter, the linear PCM digital audio data is read from the cache memory 11 in a predetermined timing, for example, in units of ADIP cluster-equivalent data, and transferred to the write/read unit 4. In the write/read unit 4, the compressed data thus transferred is modulated by the EFM modulation method or ELL (1-7) PP modulation method, and written as an audio track in the concealing area on the MD 90.

Also, along a second route along which an audio track is recorded to the MD 90 as a recording medium, audio data allowed by the PC 200 to be recorded to the concealing area is supplied to the audio data processor 7. In this case, it is checked between the PC 200 and system controller 12 whether data recorded to the MD 90 via the USB hub 18 and USB interface 20 is audio data allowed to be recorded to the concealing area. When it is made sure that the data is audio data allowed to be recorded as audio data to the concealing area on the MD 90, the system controller 12 will instruct the write/read unit 4 to write, to the concealing area on the MD 90, audio data having been designated for supply from the PC 200 to the memory-transfer controller 10.

When it is allowed to write the audio data to the concealing area on the MD 90, the PC 200 will transfer an audio data file to the memory-transfer controller 10 via the USB hub 18 and USB interface 19, and the audio data file thus transferred is provisionally stored in the cache memory 11. Thereafter, the audio data file is read from the cache memory 11 in a predetermined timing or in units of an ADIP cluster-equivalent data, and transferred to the write/read unit 4. In the write/read unit 4, the compressed audio data file is modulated by the EFM modulation method or RLL (1-7) PP modulation method, and written as an audio track in the concealing area on the MD 90.

For reading the audio track recorded in the concealing area on the MD 90, the write/read unit 4 demodulates read data to ATRAC-compressed data and transfers it to the audio data processor 7. The audio data processor 7 will make ATRAC compression-decoding of the audio data read from the MD 90 and having been ATRAC-coded to provide linear PCM audio data, and supplies it as digital data from the audio data output unit 6 to outside. Alternatively, the D-A converter converts the audio data into analog audio data and supplies it to the line output/headphone.

Note that for connection to the PC 200, for example, an interface complying with the standard defined in the IEEE (the Institute of Electrical and Electronics Engineers, Inc.), a so-called IEEE 1394 interface, or general-purpose interconnecting interface may be used in addition to the USB hub and USB interface.

Next, peripheral units for the write/read unit 4, audio data processor 7, audio data input unit 5 and audio data output unit 6, included in the MD recording player 1, will be described in detail below with reference to FIG. 3.

The write/read unit 4 is a recording/reproducing system to make data write from or read to the conventional Mini Disk (MD) 90. The write/read unit 4 is designed to make EFM modulation and ACIRC coding, for writing data to the MD 90. It is also designed to make EFM demodulation and ACIRC decoding, for reading data from the MD 90. Also, in the write/read unit 4, the MD 90 loaded therein is rotated by a spindle motor 31 under the CLV or ZCAV control. For data write or read, an optical head 32 emits laser light to the MD 90.

For writing data to the MD 90, the optical head 32 emits high-level laser light for heating the recording track up to the Curie temperature. When reading data from the MD 90, the optical head 32 will low-level laser light for detecting data from return light under the magnetic Kerr effect. On this account, the optical head 32 has installed therein an optical system including a laser diode as a laser output means, polarization beam splitter, objective lens, etc. and a detector to detect return light. The objective lens included in the optical head 32 is supported by a biaxial mechanism, for example, to be movable toward and away from the MD 90 radially of the latter. Also in this embodiment, the optical head 32 is designed to be able to write or read data to or from different types of Mini Disks different in physical specifications of the surface from each other, and is provided in the light path of the light emitted from the optical head 32 with a phase compensation plate capable of optimizing the bit error rate at the time of reading in order to assure the best performance of reading with any of such different types of Mini Disks.

A magnetic head 33 is disposed opposite to the optical head 32 with the MD 90 being positioned between them. The magnetic head 33 applies the MD 90 with a magnetic field modulated with data to be recorded. Also, there are provided a sled motor and sledding mechanism (not shown) to move the optical head 32 as a whole and the magnetic head 33 radially of the MD 90.

In this write/read unit 4, there are provided a recording system, reproduction system, servo control system, etc. in addition to a write/read head system including the optical head 32 and magnetic head 33 and a disk rotation driving system including the spindle motor 31. In the recording system, there are provided posts at which EFM modulation and ACIRC coding are made of data going to be written to the MD 90. Also, the reproduction system includes posts at which demodulation corresponding to the EFM modulation and ACIRC decoding are made of data going to be read from the MD 90.

A return part of the laser light projected from the optical head 32 to the MD 90 is detected as a photo-electric current by a photodetector and supplied to an RF signal processor 34. The RF signal processor 34 makes current-voltage conversion, amplification, matrix calculation, etc. of the supplied detected information to extract a read RF signal, tracking error signal TE and focusing error signal FE as read information, and ADIP information as groove information recorded as track wobbling on the MD 90.

For playing back the MD 90, the read RF signal extracted by the RF signal processor 34 is passed through an ADIP_PLL circuit 35 and EFM_PLL circuit 36 to an EFM and/or ACIRC coder decoder (EFM/ACIRC codec) 37 where it will be processed to provide a tracking error signal (Detrack), focusing error signal (Defocus) and lens shift signal (LensShift). The signal outputs from the RF signal processor 34 re supplied to each servo signal processor provided downstream of the RF signal processor 34. The groove information is supplied to the ADIP_PLL circuit 35. The ADIP_PLL circuit 35 extracts wobble component by limiting the frequency band of the groove information by means of a bandpass filter, and then makes FM demodulation and biphase demodulation of the wobble component to extract an ADIP address. The groove information is returned to a servo signal processor 46 for servo control of the spindle.

The read RF signal is binarized by an EFM and/or ACIRC coder decoder (EFM/ACIRC codec) 37 into an EFM signal train, and then subjected to EFM demodulation, and further to error connection and deinterleaving for the purpose of ACIRC demodulation. In case the data is audio data, it will be ATRAC-compressed at this time point. Demodulated ATRAC-compressed data is provisionally stored as data read from the MD 90 into a DRAM 39 corresponding to the cache memory 11 under the control of a DRAM controller 38 corresponding to the memory-transfer controller 10. The compressed data will be read from the DRAM 39 depending upon how it is used in an ATRAC coder decoder (ATRAC codec) 40 corresponding to the audio data processor 7.

The ATRAC-compressed data is ATRAC-decoded in the ATRAC codec 40, and supplied from an output unit 43 such as a headphone or speaker via an AD/DA converter 41 corresponding to the audio data input unit 5 and an amplifier 42. The MD recording player 1 can also acquire external sound or voice via a microphone 44, amplifier 45 and AD/DA converter 41.

Based on an error signal provided by integrating a difference in phase of a read clock (PLL-system clock for decoding) from the supplied groove information, the servo signal processor 46 generates an spindle error signal for the CLV servo control and ZCAV servo control, and sends it to a drive circuit 50. Also, based on the tracking error signal, focusing error signal, lens shift, track jump commend, access command, etc. supplied from the RF signal processor 34, servo signal processing circuits 47, 48 and 49 generate various servo control signals such as a tracking control signal, focus control signal, sled control signal, spindle control signal, etc., and supplies them to each of drive circuits 51, 52 and 53. That is, each of the servo signal processing circuits 47, 48 and 49 processes the servo error signal or command by phase compensation, gain control, target value setting, etc. as necessary to generate various servo control signals.

Each of the drive circuits 50, 51, 52 and 53 generates a predetermined servo drive signal on the basis of a servo control signal supplied from the servo signal processing circuit. The servo drive signals referred to herein are a biaxial drive signal for driving the biaxial mechanism (in two kinds for focusing and tracking directions, respectively), a sled motor drive signal for driving the sledding mechanism, and a spindle motor drive signal for driving the spindle motor 31. With such servo drive signals, focus control and tracking control are made of the MD 90, and CLV or ZCAV control is made of the spindle motor 31.

When recording data to the MD 90, ATRAC-compressed data will be supplied from the memory-transfer controller 10 shown in FIG. 2. When write is made to the MD 90, the EFM/ACIRC codec 37 is put into operation. When the data in consideration is audio data, it is interleaved and has an error correction code appended thereto in the encoder section of the ACIRC codec 37, and then EFM-modulated. The EFM-modulated data is supplied to a magnetic head driver 54 and the magnetic head 33 applies the MD 90 with a magnetic field based on the EFM-modulated data, whereby the modulated data is recorded to the MD 90.

An concrete example of the EFM/ACIRC codec 37 will be described in detail below with reference to FIG. 4. The write/read unit 4 has substantial parts corresponding to the spindle motor 31, optical head 32, magnetic head 33, RF signal processor 34, ADIP_PLL circuit 35, EFM_PLL circuit 36, EFM/ACIRC codec 37, servo signal processor 46, servo signal processors 47, 48 and 39, drive circuits 50, 51, 52 and 53 and magnetic head driver 54 in the MD recording player 1 as shown in FIG. 3.

The write/read unit 4 rotates the loaded disk 90 by the spindle motor 31 under the CLV control. For writing or reading data, laser light is emitted from the optical head 32 to the disk 90. It should be noted here that the MD recording player 1 is compatible with three types of Mini Disks 90 including a disk designed in compliance with the current MD specifications, a disk adopting an improved version of the modulation technique used in the magneto-optical recording method for the disk meeting the current MD specifications, and a new type of Mini Disk improved in performance of data concealment and recording density by adopting a different signaling technology from that for the recording format commonly used in the recording/playing methods for an MD using the conventional magneto-optical recording technology. Namely, these disks are to be driven at different linear velocities, respectively. Thus, the spindle motor 31 will have to run correspondingly to a linear velocity designated for each disk 90 loaded in place in the MD recording player 1.

The optical head 32 works to emit a high-level laser light for heating the recording track up to the Curie point when recording data to the disk 90, and a relatively low-level laser light for detecting data from return light from the disk 90 under the magnetic Kerr effect when reading data from the disk 90. On this account, the optical head 32 has installed therein an optical system including a laser diode as a laser output means, polarization beam splitter, objective lens, etc. and a photodetector for detecting return light from the disk 90. The objective lens used in the optical head 32 is supported by a biaxial mechanism, for example, to be movable radially toward or away from the disk 90.

Also, the magnetic head 33 is disposed opposite to the optical head 32 with the disk 90 being positioned between them. The magnetic head 33 applies the disk 90 with a magnetic field modulated with data to be recorded. Also, there are provided the sled motor and sledding mechanism (not shown) to move the optical head 32 as a whole and the magnetic head 33 radially of the disk 90.

In case the disk is a second next-generation MD, the optical head 32 and magnetic head 33 will make a pulse-driven magnetic field modulation to enable higher-density recording. The current MD and first next-generation MD adopts the magnetic field modulation.

The write/read unit 4 further includes a recording system, reproduction system, servo control system, etc. in addition to the write/read head system including the optical head 32 and magnetic head 33 and disk rotation driving system including the spindle motor 31.

In case the disk used is in compliance with the current MD system, the recording system has formed therein a post at which when data to be recorded is audio data, it is subjected to ACIRC error correction and EFM modulation before recording. In case the disk used is the first or second next-generation MD, the recording system has formed therein a post at which data is subjected to an error correction being a combination of BIS and LDC and RLL (1-7) PP modulation before recording.

For playing back a disk complying with the current MD system, the reproduction system will have formed therein a post at which data is subjected to EFM demodulation and ACIRC error correction. For playing back a first- or second next-generation MD, the reproduction system will have formed therein a post at which data is subjected to an RLL (1-7) PP demodulation based on the data detection using a partial response and Viterbi decoding and error correction being a combination of BIS and LDC. The reproduction system has also formed therein a post at which an address based in an ADIP signal from the disk complying with the current MD system or first next-generation MD is decoded, and a post at which an ADIP signal from the second next-generation MD is decoded.

The photo-electric current produced by converting return light from the MD 90 by the photodetector is supplied to the RF signal processor 34. The RF signal processor 34 will make current-voltage conversion, amplification, matrix calculation and other processing of the supplied detected information to extract a read RF signal, tracking error signal TE, focusing error signal FE, ADIP information and the like as read information.

In case the MD 90 is a disk complying with the current MD system, the read RF signal from the RF amplifier is processed in an EFM demodulator 68 and ACIRC decoder 69. That is, the read RF signal is binarized by the EFM demodulator 68 to provide an EFM signal train, the EFM signal train is subjected to EFM demodulation, and then to error correction and deinterleaving in the ACIRC decoder 69. At this time, the data is an ATRAC-compressed one. In case the MD 90 is in compliance with the current MD system, a selector 70 selects a B-contact and the demodulated ATRAC-compressed data is provided as read data from the disk 90.

On the other hand, for playing back a first or second next-generation MD, the read RF signal supplied from the RF signal processor 34 is processed by an RLL (1-7) PP demodulator 66 and RS-LDC decoder 67. More specifically, the read RF signal is processed based on the data detection using PR (668) ML or PR (1, −1) ML and Viterbi decoding in the RLL (1-7) PP demodulator 66 to provide read data as an RLL (1-7) code train, and the RLL (1-7) code train is subjected to RLL (1-7) demodulation. Further, the demodulated data is subjected to error correction and deinterleaving in the RS-LDC decoder 67. For playing back a first or second next-generation MD, the selector 70 selects A contact and the data subjected to the RLL (1-7) PP demodulation is supplied as read data from the MD 90.

The tracking error signal and focusing error signal supplied from the RF signal processor 34 are supplied to the servo signal processing circuit 46, and groove information is supplied to an ADIP demodulator 80. The ADIP demodulator 80 extracts wobble component by limiting the frequency band of the groove information by means of the bandpass filter, and then makes FM demodulation and biphase demodulation of the wobble component to demodulate the ADIP signal. The ADIP address as absolute-address information, thus demodulated, is supplied to the system controller 12 shown in FIG. 2. The system controller 12 will make a predetermined control on the basis of the ADIP address. Also, the groove information is supplied to the servo signal processing circuit 46 for servo control of the spindle.

The servo signal processing circuit 46 generates a spindle error signal for the CLV servo control on the basis of an error signal obtained by integrating a difference in phase of the groove information from the read clock (PLL-system clock for decoding). Also, the servo signal processing circuit 46 generates various servo control signals such as tracking error signal, focus control signal, sled control signal, spindle control signal, etc. on the basis of the tracking error signal and focusing error signal supplied from the RF signal processor 34 or track-jump command, access command, etc. supplied from the system controller 12, and supplies them to the drive circuit 50. Namely, the servo signal processing circuit 46 makes necessary processes such as phase compensation, gain control, target value setting, etc. of the servo error signals and commands to generate the various servo control signals.

The drive circuit 50 generates a predetermined servo drive signal on the basis of the servo control signal supplied from the servo signal processing circuit 46. The servo drive signal includes a biaxial drive signals for driving the biaxial mechanism (2 kinds of signals for the focusing direction and tracking direction), sled motor drive signal for driving the sledding mechanism and a spindle motor drive signal for driving the spindle motor 31. With such servo drive signals, focusing and tracking in relation to the disk 90 are controlled and the spindle motor 31 is CLV-controlled.

For writing audio data to a disk complying with the current MD system, a selector 65 select the B contact to enable an ACIRC encoder 63 and EFM demodulator 64. In this case, the compressed data supplied as data to be recorded from the cache memory 11 shown in FIG. 2 is interleaved and has an error correction code appended thereto in the ACIRC encoder 63, and then subjected to EFM modulation in the EFM modulator 64. Then, the EFM-modulated data is supplied to the magnetic head driver 54 via the selector 65, and the magnetic head 33 applies the disk 90 with a magnetic field based on the EFM-modulated data, to thereby record an audio track to the disk 90.

On the contrary, for recording data to a first or second next-generation MD, the selector 65 will select the A contact to enable an RS-LDC encoder 61 and RLL (1-7) PP modulator 62. In this case, high-density data from the cache memory 11 is interleaved and has an RS-LDC error correction code appended in the RS-LDC encoder 61, and then subjected to RLL (1-7) modulation in the RLL (1-7) PP modulator 62. Then, the data to be recorded as the RLL (1-7) code train is supplied to the magnetic head driver 54 via the selector 65, and the magnetic head 33 will apply the disk 90 with a magnetic field based on the modulated data to record a data track on the disk 90.

Also, there is provided a laser driver 60 which has the laser diode emit laser light when reading or writing data from or from the disk and also make APC (automatic laser power control).

In the optical head 32, there is provided a detector (not shown) for monitoring the laser power. A monitor signal from the detector is fed back to the laser driver 60. The laser driver 60 makes a comparison between a current laser power detected as the monitor signal and a currently setting of the laser power, and has the laser power signal reflect an difference between the current and set laser powers, to thereby control the laser power output from the laser diode to be stable at the laser power setting. It should be noted that the laser power for data write is different from that for data read. A value as the reading laser power or writing laser power is set in a register inside the laser driver 60 by the system controller 12.

The above-mentioned operations such as access, various modes of servo control, data writing and data reading are effected under the control of the system controller 12 shown in FIG. 2.

Next, an example of each of the area structure and data management structure on the surface of the MD 90 compatible with the MD recording player 1 as the embodiment of the present invention will be described with reference to the drawings.

Figure 5:
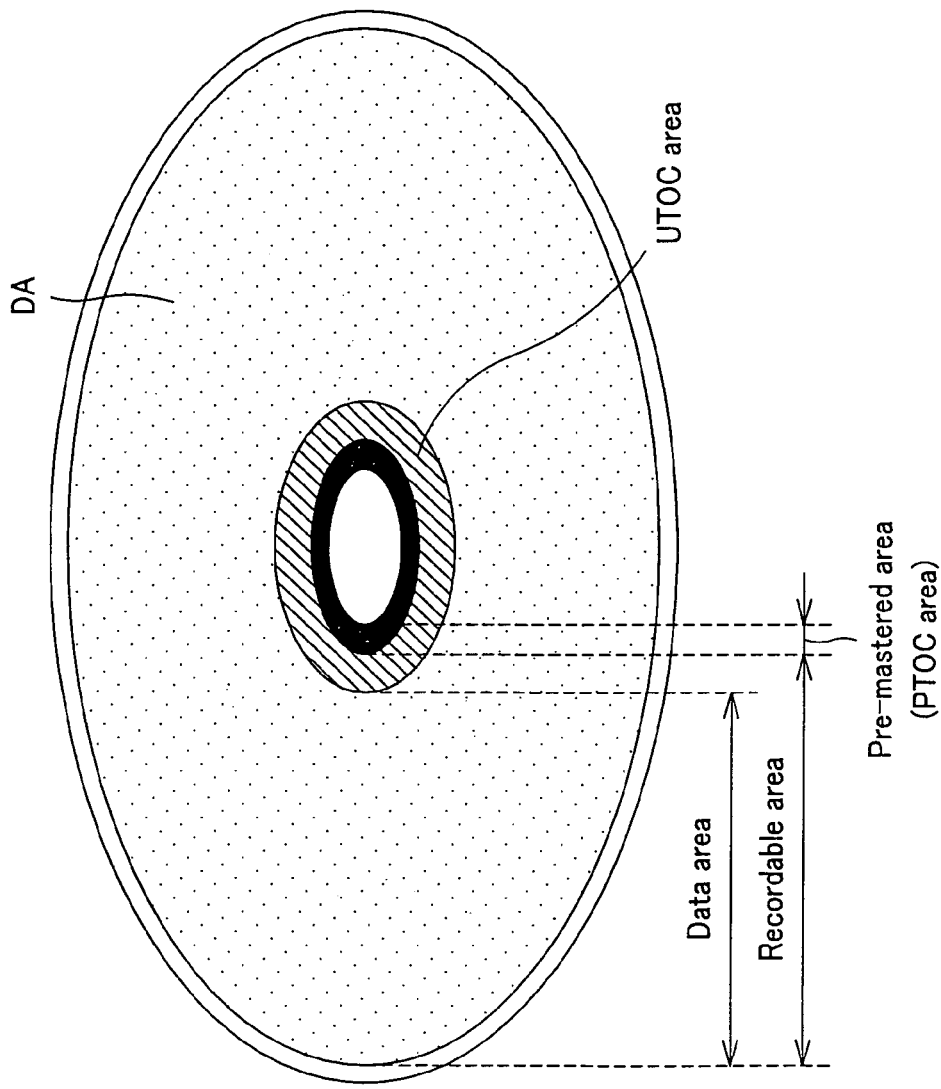
FIG. 5 is a schematic illustration of a mini disk (MD) recordable and playable in the MD recording player, showing an example of the area assignment on the disk surface.
Figure 6:
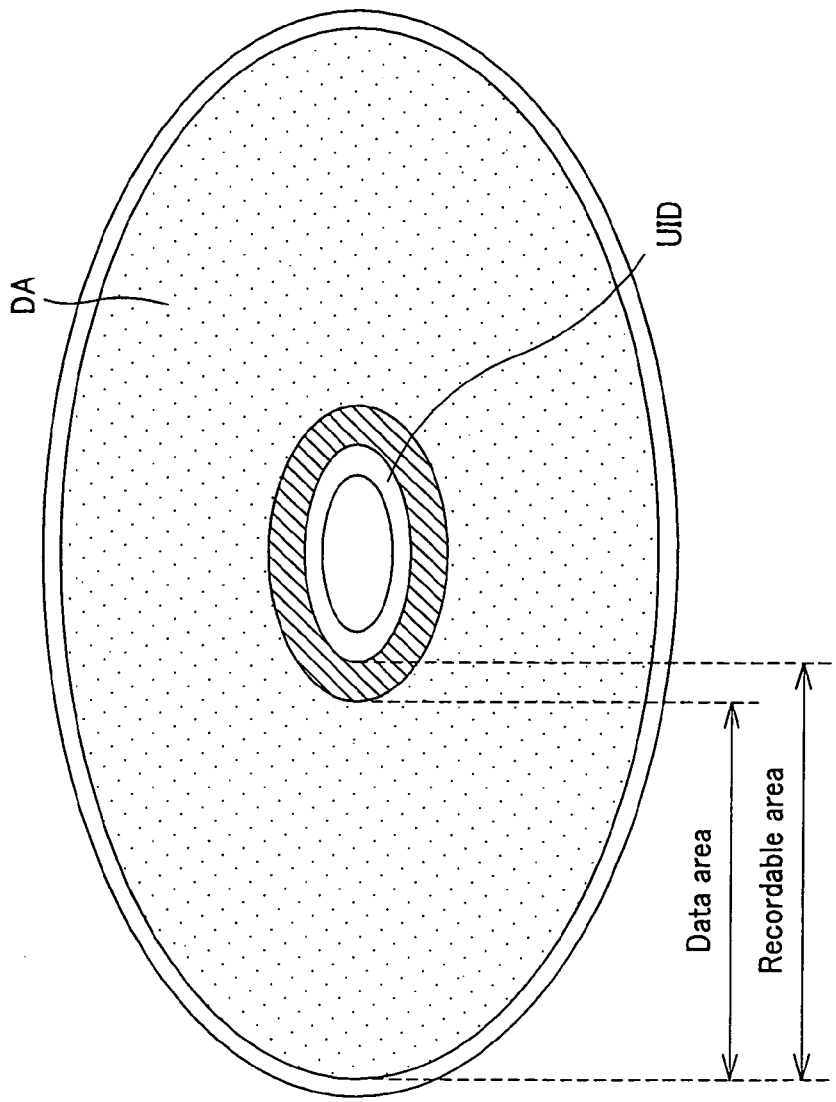
FIG. 6 is also a schematic illustration of the MD, showing another example of the area assignment on the disk surface.

FIGS. 5 and 6 schematically illustrate the example of an area structure on the surface of the MD 90. As shown, a PTOC (pre-mastered table of contents) is provided as a pre-mastered area at the innermost radius of the MD 90. The PTOC area has recorded therein disk management information as embossed pits formed by physically deforming the disk surface structure. The outer radial area than the pre-mastered area is a recordable area to or from which data can be magneto-optically written or read, and has formed therein a groove as a pregroove for the recording track. The innermost radial area of the recordable area is a UTOC (user table of contents) consisting of a buffer area to which UTOC information is recorded and which also provides a buffer against the pre-mastered area, and a power calibration area used to adjust the laser light output power and work otherwise.

As shown in FIG. 6, the MD 90 does not use any prepits in order to permit higher-density recording. Thus, there is not formed any PTOC area in a Mini Disk adopting a different signaling technology from that for the recording format commonly used in the recording/playing methods for an MD using the conventional magneto-optical recording technology. In an inner radial area than the recordable area in this MD 90, there is formed a unique ID area (UID) in which copyright management information, data falsification checking information and other private information, etc. are to be recorded. A different recording method from the DWDD method used in the MD 90 is used to record such information in this UID area.

Figure 7:
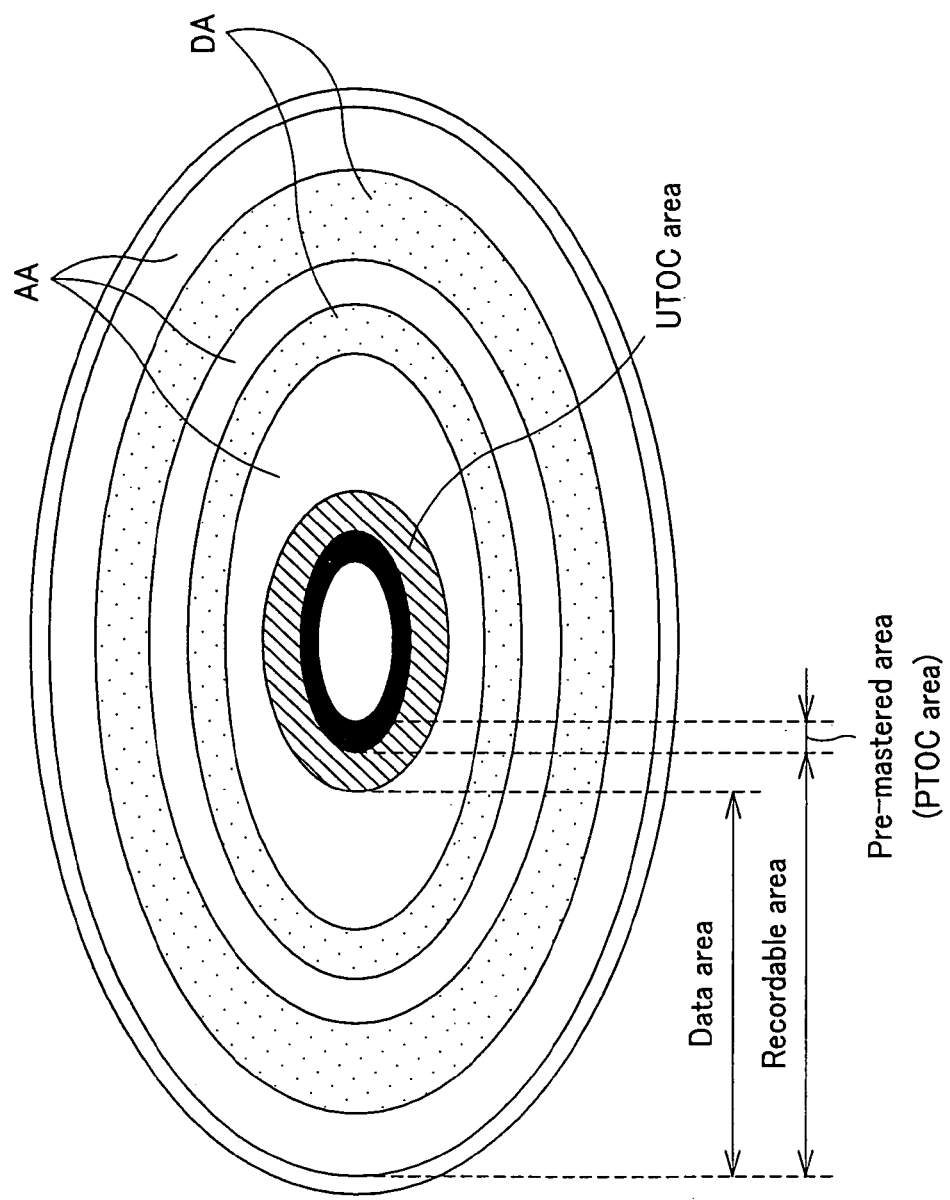
FIG. 7 is a schematic illustration of the MD, showing yet another example of the area assignment on the disk surface in which audio data and PC data are recorded together.

Note here that in each of the aforementioned types of Mini Disks, there may be recorded together an audio track for audio data and a data track for data. In this case, an audio recording area AA having at least an audio track recorded therein and a PC data recording area DA having at least a data track recorded therein will be formed in arbitrary positions in the data area, as shown in FIG. 7 for example.

In the MD 90, a series of audio and data tracks may not always be recorded in physical succession but may be recorded being divided in a plurality of parts. The "part" means a section where tracks are recorded in physical succession. More specifically, even if two PC data recording areas physically apart from each other exist on the MD 90, the data tracks are handled as one track in one case, and as a plurality of tracks in the other case.

Next, an example of the data management structure in the MD 90 will be described with reference to FIG. 8. In the MD recording player 1, the MD 90 is managed by a FAT file system. Also, in the MD recording player 1, content data is managed by a directory structure which will be described below.

Figure 8:
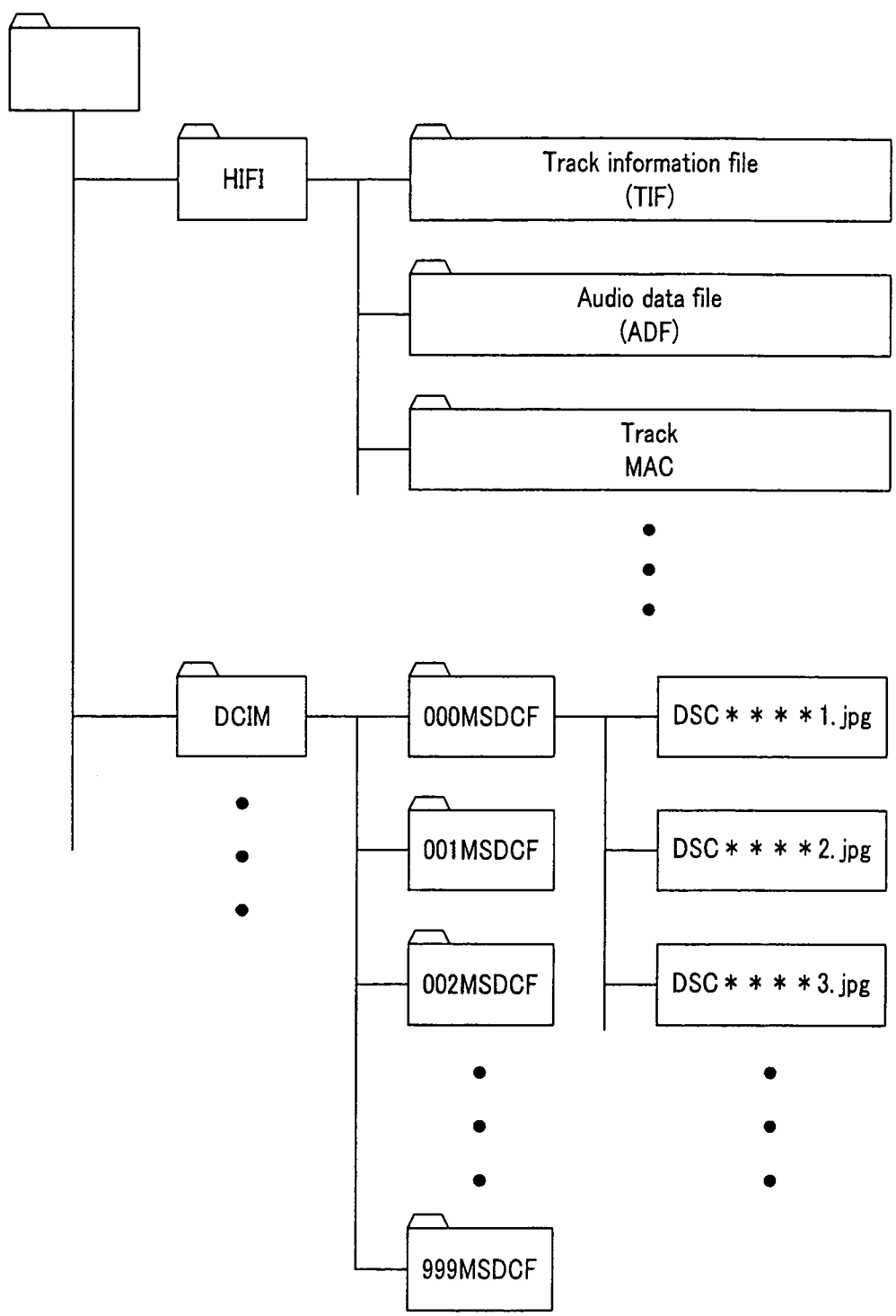
FIG. 8 explains an FAT file system as an example of the audio data management system.

As shown in FIG. 8, in the Mini Disk, there is prepared "HIFI" as a directory for storage of an audio file and "DCIM" as a directory for storage of still-picture data. In the audio directory "HIFI", there are generated a track information file (will be referred to as "TIF" hereunder) and audio data file (will be referred to as "ADF" hereunder) as sub directories, track MAC, etc. As shown in FIG. 8, a deletion history file which will be described in detail later is prepared by the MD recording player 1.

Also, the still-picture directory DCIM for store of picture data captured by a digital camera includes folders "*MSDCF (where * is any of 000 to 999)" numbered as 000 to 999 as sub directories. Each of the sub directories has stored therein captured still-picture data having appended thereto a file name like DSC**.jpg (where * is time information) according to a predetermined naming rule.

The directory structure shown in FIG. 8 also includes files of security information and content generation-management information, etc. unique to the MD 90. The security information and content generation-management information include EKB (enabling key block) as read enabling information for each recorder/player, track MAC as content falsification checking information, etc.

The track information file (TIF) in the audio directory HIFI corresponds to encryption information on audio content data. The track information file (TIF) and audio data file (ADF) are managed by the FAT file system.

The MD recording player 1 as the embodiment of the present invention is adapted to restore copyright-protected data by generating a deletion history when, for example, a checked-in or -out copyright-managed content has to be deleted because the recording capacity becomes insufficient for recording any new content. There will be described some methods of restoring a deleted copyright-protected content to use that content again without any inconvenience.

The first one of the content restoring methods of restoring a content deleted in the MD recording player 1 is such that a deletion history is generated for each content deleted by the MD recording player 1 and recorded to the recording area on the MD 90 as a recording medium. Also, the second method is such that a history, namely, a recording history, is generated for a content the PC 200 has moved to the MD 90 and stored into a memory such as the PC 200. Further, the third method is such that a deletion history is generated in the MD recording player 1 while a recording history is generated in the PC 200. These methods will be described in further detail.

Figure 9:
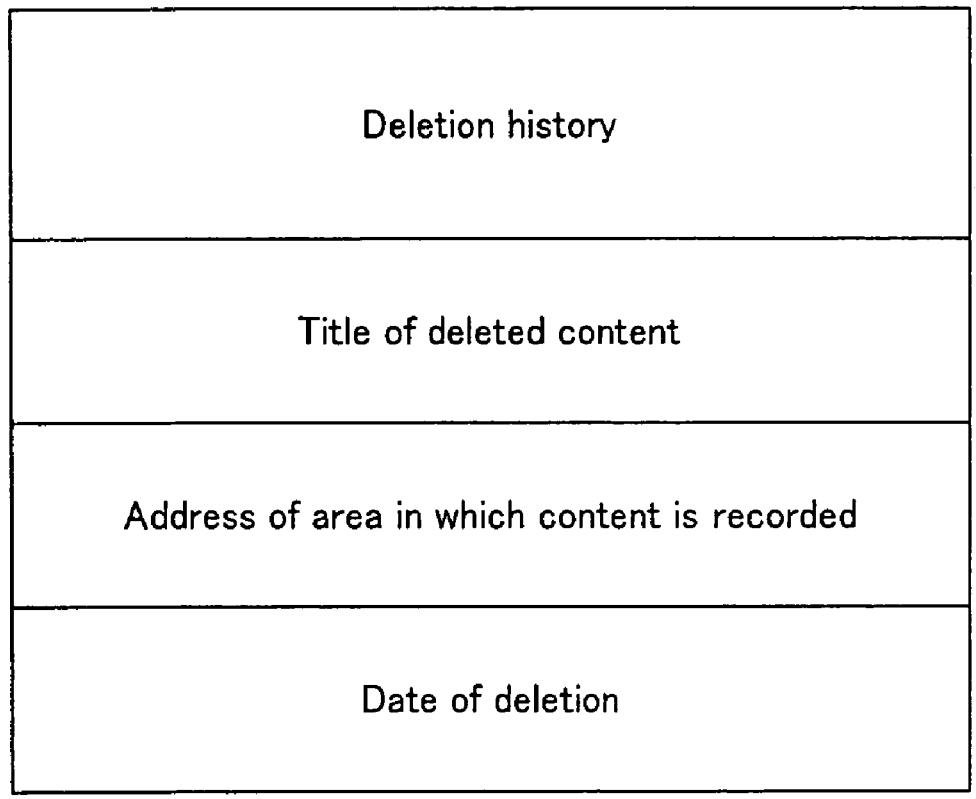
FIG. 9 shows an example of the deletion history generated in the MD by a first method in the MD recording player.

First, the first method will be described. FIG. 9 shows an example of the deletion history generated in the MD recording player 1. As shown, the deletion history includes fields for identification information for identifying a content, address of a recording area where the content is recorded, time of deletion is stated, etc.

Figure 10:
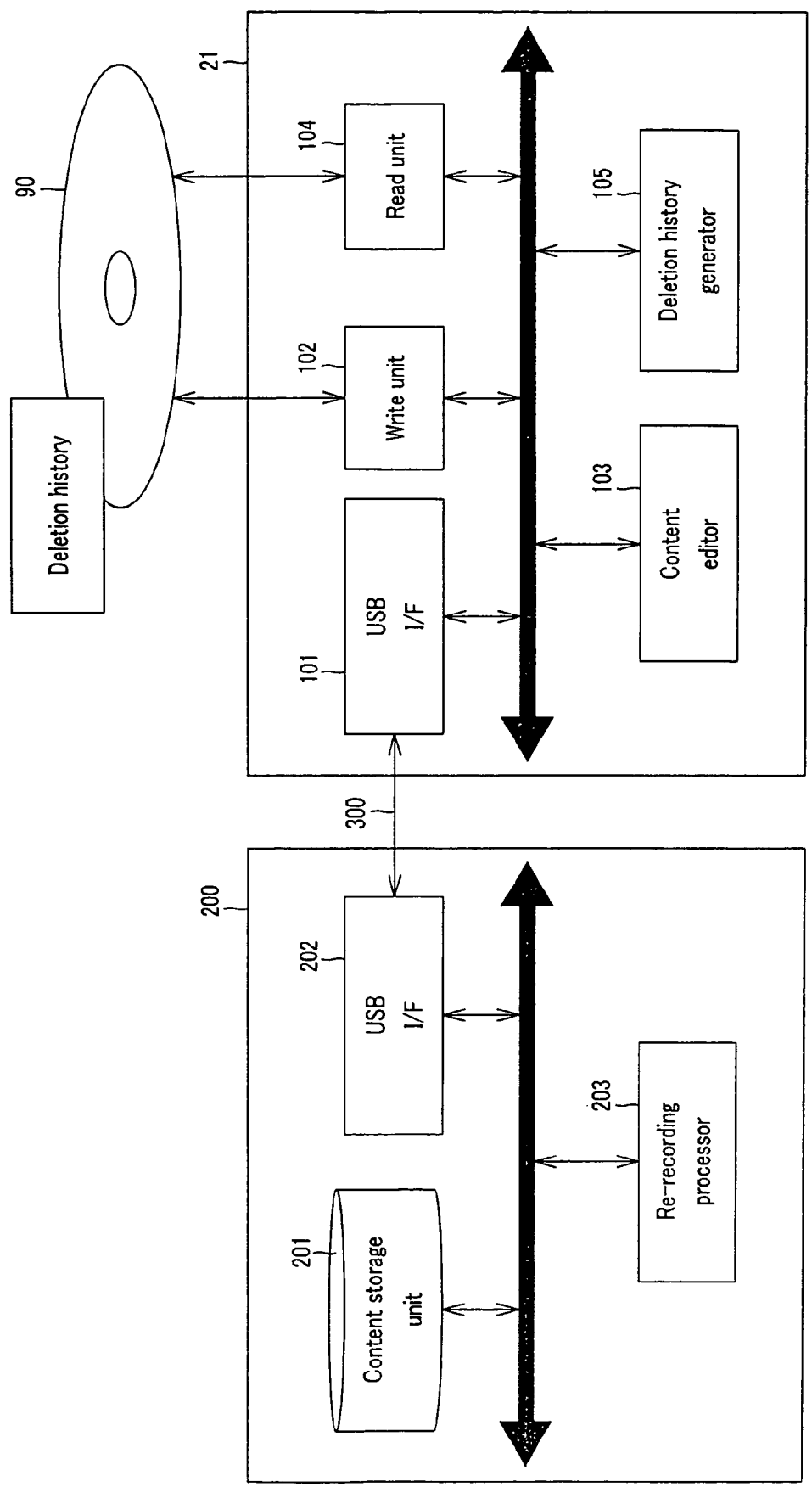
FIG. 10 shows functions of a personal computer and MD recording player, working together to carry out the first method.

FIG. 10 shows the functional blocks of the PC 200 and MD recording player 1, for implementing the first method. For the first method, the PC 200 includes a content storage unit 201 such as HDD for storing content data, USB interface 202 for transferring a content stored in the content storage unit 201 to the MD recording player 1, and a re-recording processor 203 to re-record a content deleted in the MD recording player 1.

Also, the MD recording player 1 includes a USB interface 101 corresponding to the external interface 8, a write unit 102 corresponding to the write/read unit 4 and which records a content supplied via the USB interface 101 to the MD 90, a content editor 103 to delete, change, add or otherwise process a content recorded in the MD 90, a read unit 104 to read a content recorded in the MD 90, and a deletion history generator 105 to generate a deletion history.

When instructed to delete a content, the content editor 103 edits TOC (table of contents). The TOC has recorded therein a start position and end position of the content, and a content reading sequence. The content editor 103 edits TOC to delete the content. When the content editor 103 has deleted the content, the deletion history generator 105 records information for identification of the deleted content, date of content deletion, etc. to the deletion history.

The MD recording player 1 will store a deletion history having items shown in FIG. 9 as a deletion history file directory after a track information file, audio data file, track MAC, etc. as sub directories of the HIFI directory in the data management structure in the MD 90 shown in FIG. 8 for example.

When the PC 200 and MD recording player 1 are connected to each other after the content data is deleted, the PC 200, for example, will read the deletion history file stored in the MD 90 by means of the MD recording player 1, copy the deleted content registered in the deletion history file, and rerecord it to the MD 90.

The re-recording processor 203 in the PC 200 checks the recording capacity, and then re-records the deleted content on the basis of the deletion history. The re-recording processor 203 is supplied with the deletion history from the MD recording player 1. The re-recording processor 203 will read a content corresponding to the deleted content registered in the deletion history from the content storage unit 201, and transmits it to the MD recording player 1. The write unit 102 in the MD recording player 1 records the content data supplied for re-recording by the re-recording processor 203 to the MD 90.

Also, the MD recording player 1 may request the PC 200 for a content data registered in the deletion history. It should be noted that the procedure for restoring a content on the basis of the deletion history file also includes an operation for matching check-in or check-out management information recorded in the PC 200. Thus, even if a content is deleted at a check-out destination device, the right of using a checked-out content at the PC 200 can be recovered.

Figure 11A:
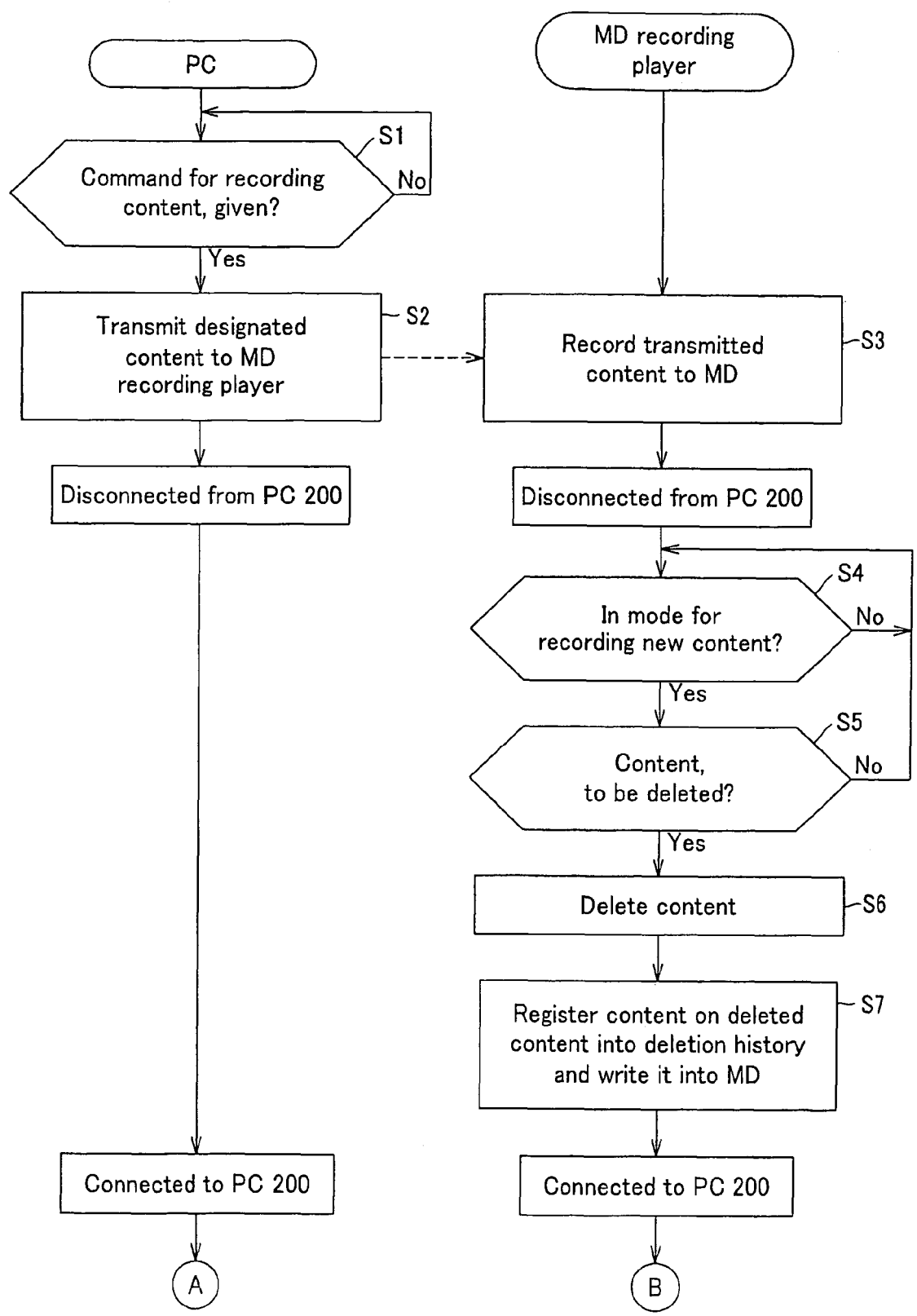
FIGS. 11A and 11B show steps of operation in restoration of a deleted content by the first method.
Figure 11B:
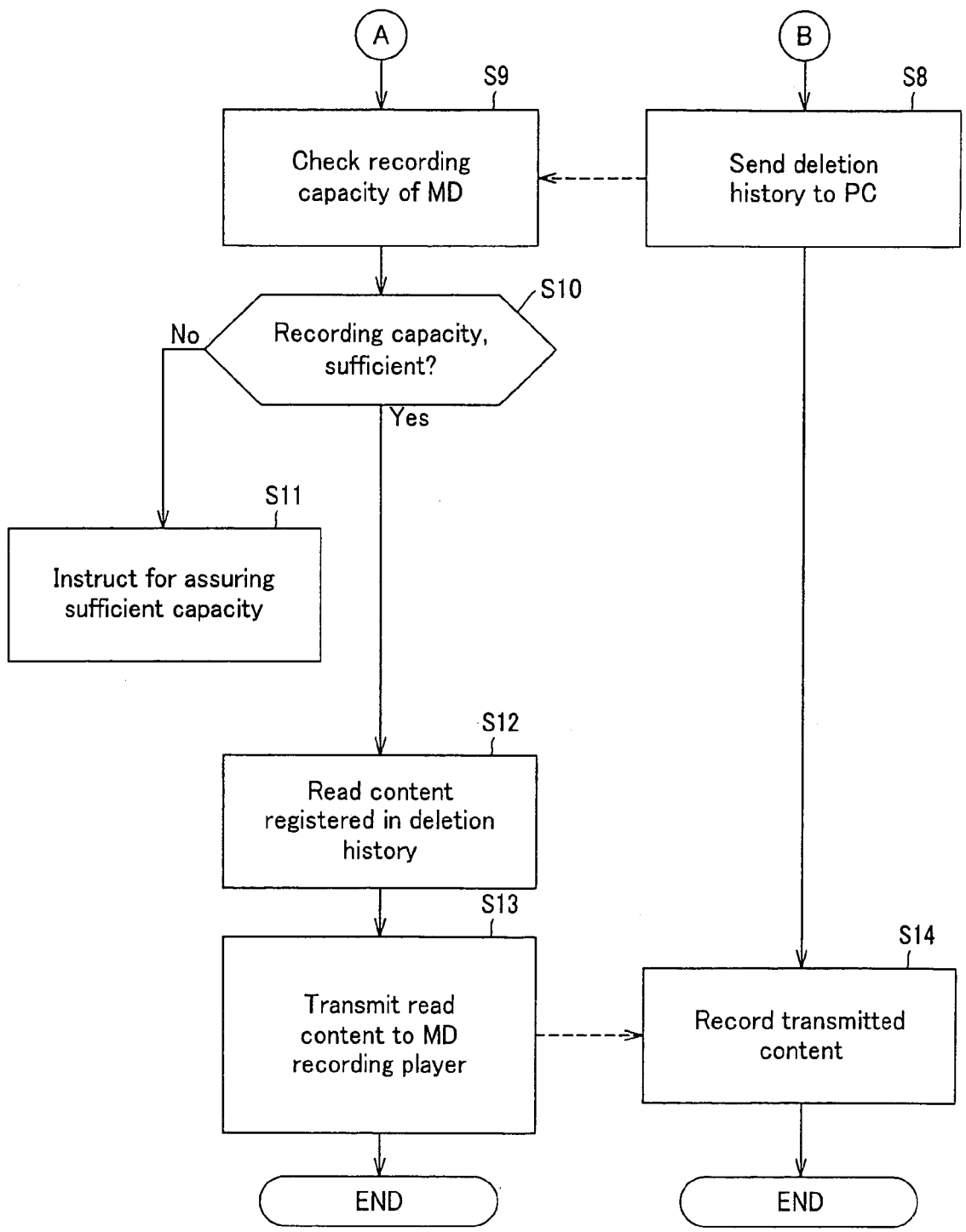

A flow of operations made in restoration of a deleted content by the above first method is shown in FIG. 11. Here will be explained an example in which when the digital camera function of the MD recording player 1 is set up, audio data recorded under the protection of copyright is deleted to assure a sufficient capacity for recording captured picture data.

First, when the user instructs the PC 200 to record a content (YES in step S1), the PC 200 will transfer a content stored in the content storage unit 201 to the MD recording player 1 (in step S2). In the MD recording player 1, the write unit 102 will write the content supplied from the PC 200 to the MD 90 (in step S3).

For example, when the user selects a mode of operation for recording a new content (YES in step S4) while the MD recording player 1 is disconnected from the PC 200 and ready for independent use, the content editor 103 will judge whether further audio data recorded in the MD 90 should be deleted to assure a sufficient recording capacity for recording an additional content (in step S5). In this example, the digital camera function of the MD recording player 1 is selected and picture data as an additional content is recorded.

For example, when deletion of audio data is selected (YES in step S5), the MD recording player 1 will delete a designated content (in step S6) and record information on the deleted content into the deletion history (in step S7).

Next, when the MD recording player 1 is connected to the PC 200, it will send the deletion history information to the PC 200 (in step S8). The PC 200 checks the recording capacity of the MD 90 (in step S9). If the recording capacity of the MD 90 is insufficient for making up for the deleted content (NO in step S10), the PC 200 will give the user an indication of an instruction for assuring a sufficient recording capacity of the MD 90 (in step S1). In case the recording capacity is sufficient (YES in step S10), the PC 200 reads audio data registered in the deletion history (in step S12), and transmits the read-out audio data to the MD recording player 1 (in step S13). Then the MD recording player 1 will record the supplied audio data (in step S14).

As above, in the first method, when audio data recorded in the MD 909 is deleted in the MD recording player 1, a deletion history is generated at the same time. So, even if the user remembers which content has been deleted, the deleted content can be re-recorded on the basis of the deletion history recorded in the MD 90.

Note that in the first method, when the PC 200 and MD recording player 1 are connected to each other next in steps S8 and S9, first the PC 200 may request the MD recording player 1 for sending the deletion history.

Next, the second method will be explained.

The second method is such that the PC 200 prepares a recording history for a content recorded in the MD 90 and stores it in its memory and recording medium. When a content in the MD 90 is deleted in the MD recording player 1 and the PC 200 is connected to the MD recording player 1 thereafter, the PC 200 will verify a content in the MD recording player 1 on the basis of the recording history recorded therein.

Figure 12:
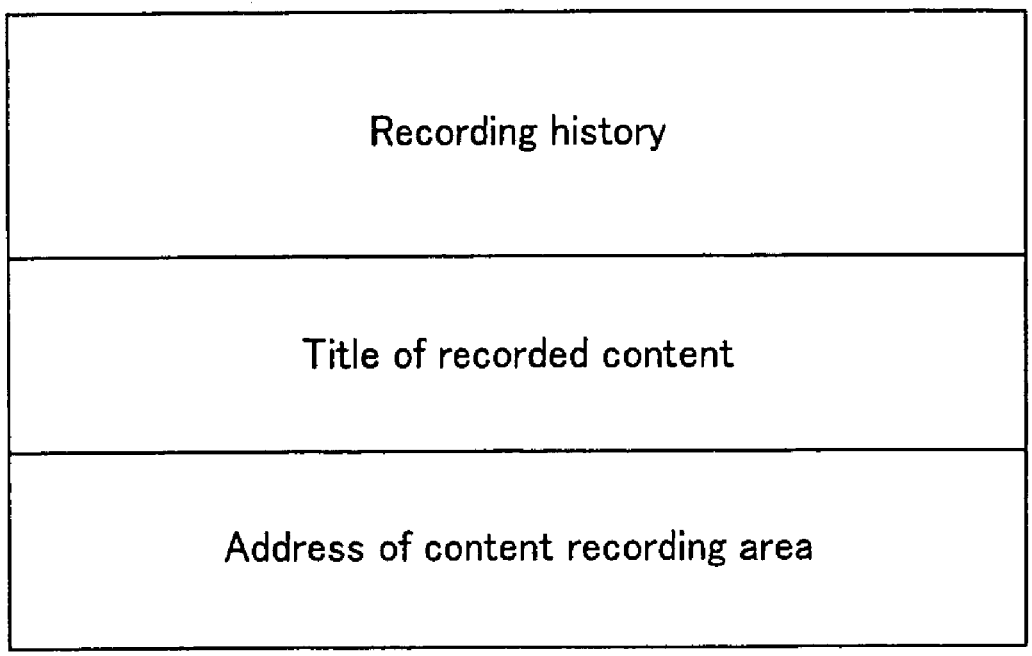
FIG. 12 shows an example of the recording history generated by a second method and held in the PC.

An example of the recording history is illustrated in FIG. 12. As shown in FIG. 12, the recording history includes fields for identification information for identifying content data recorded in the MD 90 by the MD recording player 1, address of a recording area where the content is recorded, time of recording, etc. The PC 200 makes a comparison between a content currently recorded in the MD 90 and a content previously recorded in the MD 90. If the previously recorded content is not currently found in the MD 90, the PC 200 will determine that the content is a deleted one. Since information on the content currently recorded in the MD 90 is recorded TOC in the MD 90 which is an ordinary one, the PC 200 will make a comparison between the recording history and the content of TOC, and determine that a content registered in the recording history but not recorded in the MD 90 is a deleted one.

Figure 13:
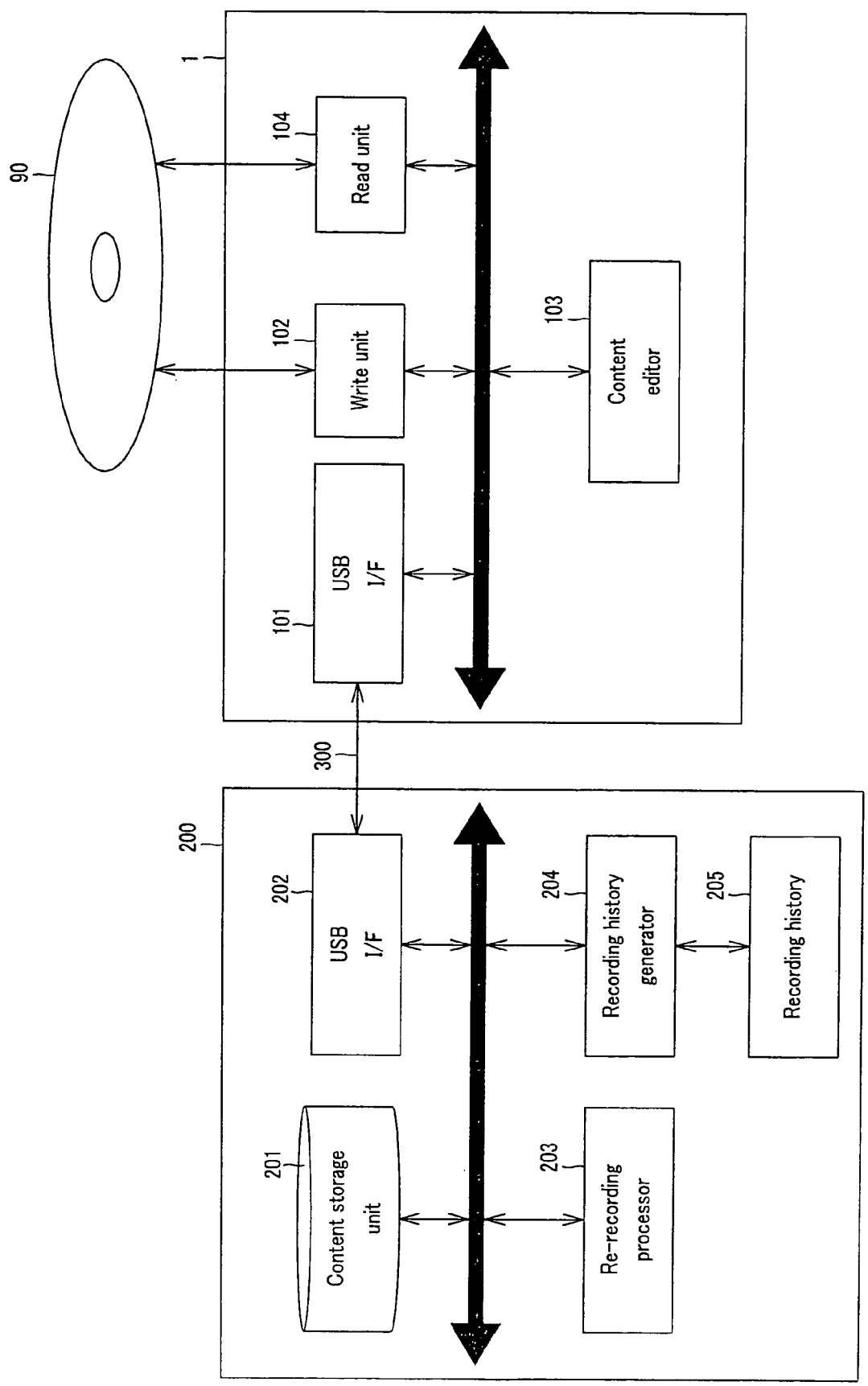
FIG. 13 shows functions of the PC and MD recording player, working together to carry out the second method.
Figure 14A:
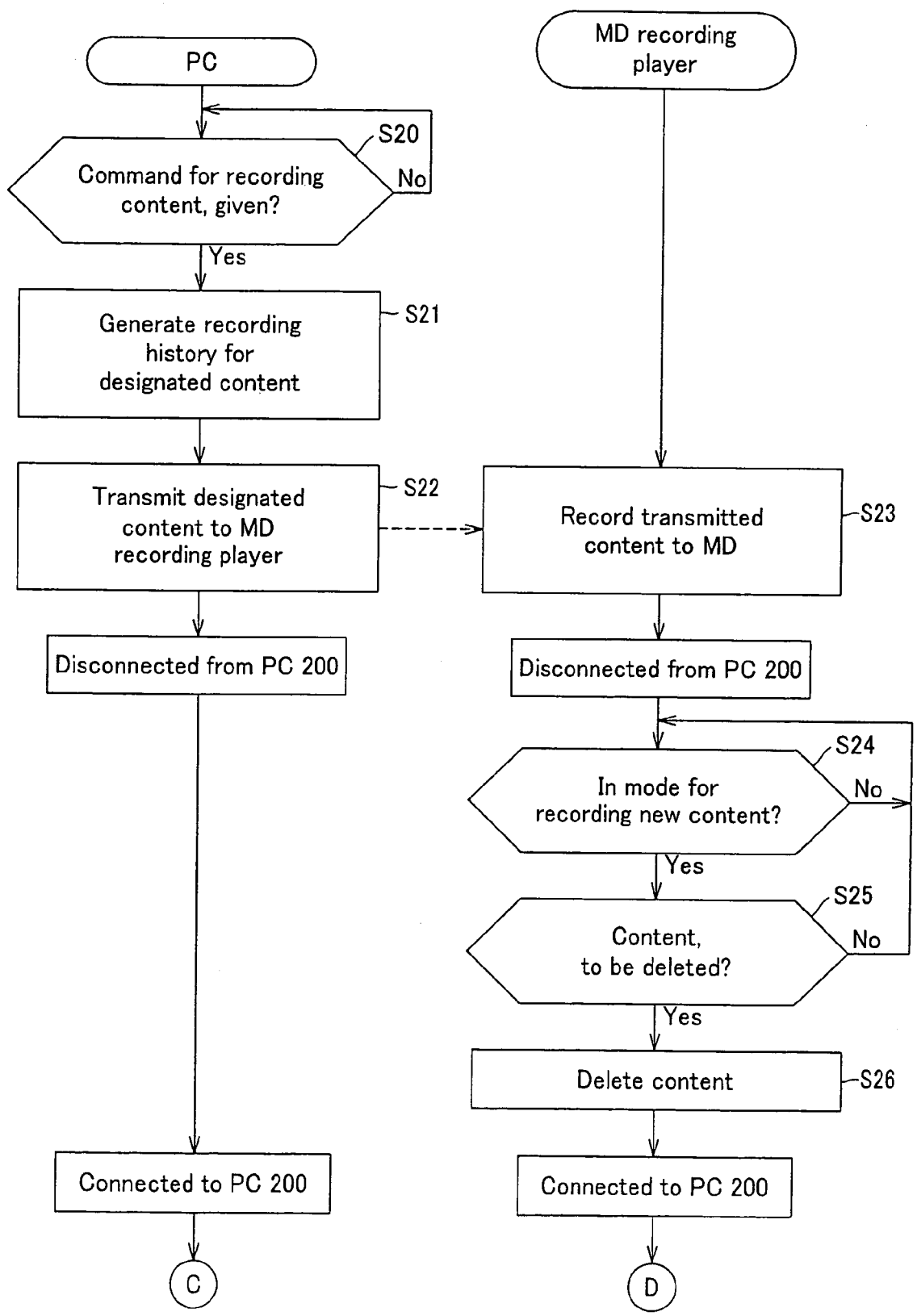
FIGS. 14A and 14B show steps of operation in restoration of a deleted content by the second method.
Figure 14B:
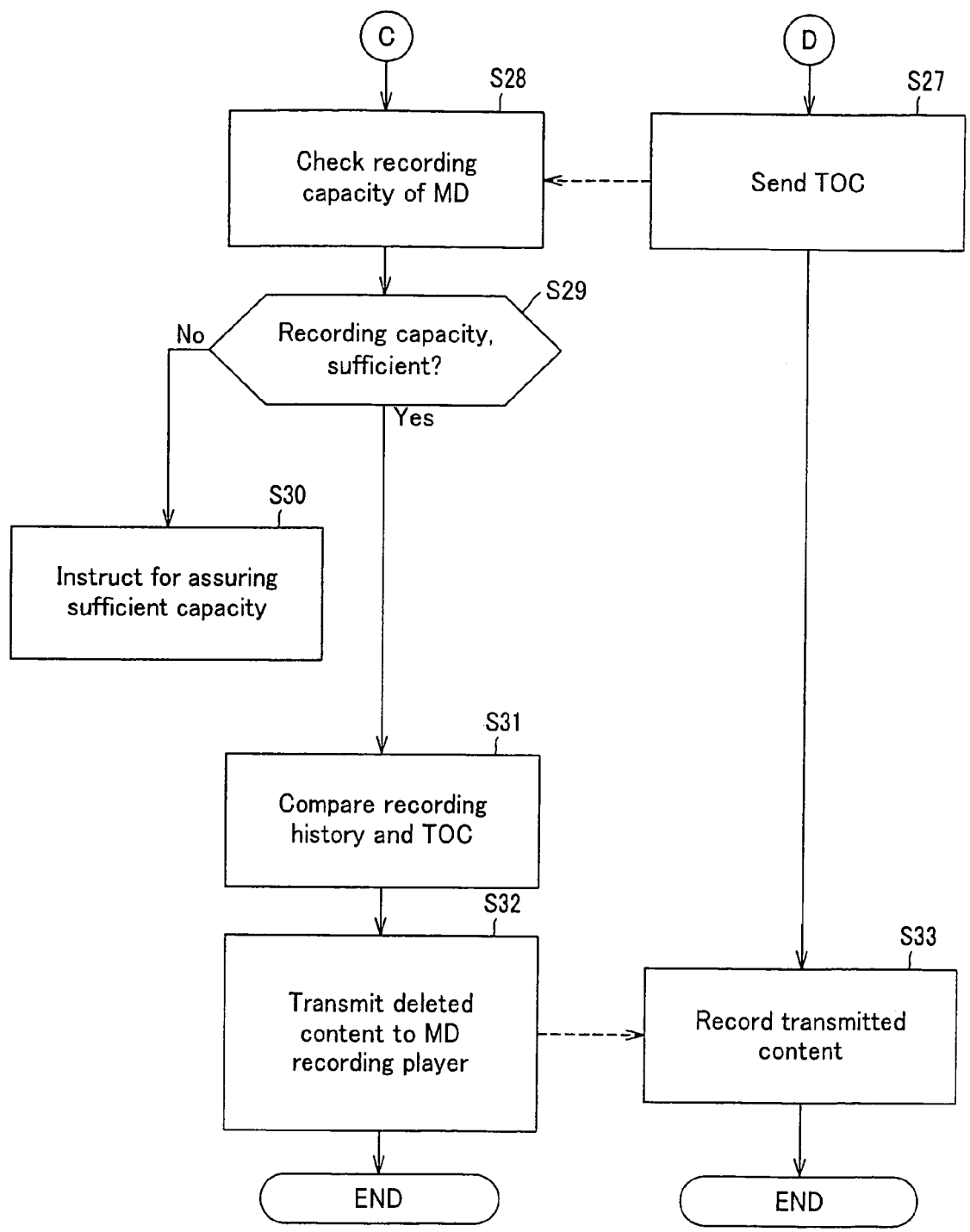

FIG. 13 shows the functional blocks of the PC 200 and MD recording player 1, for implementing the second method. For the second method, the PC 200 includes a recording history generator 204. Here will be explained an example in which when the digital camera function of the MD recording player 1 is set up, audio data recorded under the protection of copyright is deleted to assure a sufficient capacity for recording captured picture data.

The recording history generator 204 prepares a history of a content recorded in the MD recording player 1. Each time a content stored in the content storage unit 201 is transferred to the MD recording player 1, the recording history generator 204 will adds, to the recording history, information such as information for identification of a moved content, address of a recording area where the content is recorded, date of recording the content, etc.

The re-recording processor 203 makes a comparison between a content currently recorded in the MD 90 and a content previously recorded in the MD 90. If the content previously recorded in the MD 90 is not currently found in the MD 90, the re-recording processor 203 will determine that the content is a deleted one, and re-record that content.

When the user instructs the PC 200 to record a content (YES in step S20), the PC 200 will register information on the designated content to the recording history (in step S21), and then transmit a content stored in the content storage unit 201 to the MD recording player 1 (in step S23). The write unit 102 of the MD recording player 1 will record a content supplied from the PC 200 to the MD 90 (in step S23).

For example, when the user selects a mode of operation for recording a new content (YES in step S24) while the MD recording player 1 is disconnected from the PC 200 and ready for independent use, the content editor 103 will judge whether further audio data recorded in the MD 90 should be deleted to assure a sufficient recording capacity for recording the additional content (in step S25). In this example, the digital camera function of the MD recording player 1 is selected and picture data as an additional content is recorded. For example, when deletion of audio data is selected (YES in step S25), the MD recording player 1 will delete designated audio data (in step S26).

Then, when the MD recording player 1 is connected to the PC 200 next, it will send TOC in a Mini Disk loaded in place to the PC 200 (in step S27). The PC 200 checks the recording capacity of the MD 90 (in step S28). If the recording capacity of the MD 90 is insufficient for making up for the deleted audio data (NO in step S29), the PC 200 will give the user an indication of an instruction for assuring a sufficient recording capacity of the MD 90 (in step S30). In case the recording capacity is sufficient (YES in step S29), the PC 200 makes a comparison between the recording history and TOC (in step S31), and transmits the deleted audio data to the MD recording player 1 (in step S32). Then the MD recording player 1 will record the supplied audio data (in step S33).

Since in the second method, the PC 200 prepares the recording history as above, the MD recording player 1 may be a conventional one.

Note that in the second method, when the PC 200 and MD recording player 1 are connected to each other next in steps S27 and S28, first the PC 200 may request the MD recording player 1 for sending TOC of the MD 90 played therein.

Next, the third method will be explained.

Figure 15A:
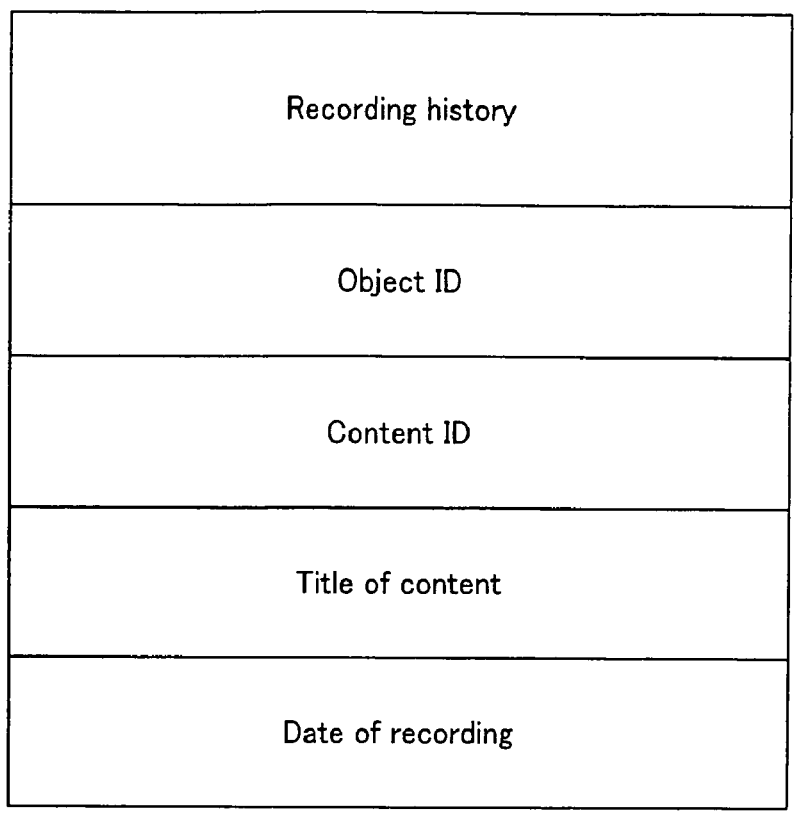
FIGS. 15A and 15B explain an example of the recording history generated in the PC by a third method, and an example of the deletion history generated in the MD by the MD recording player.
Figure 15B:
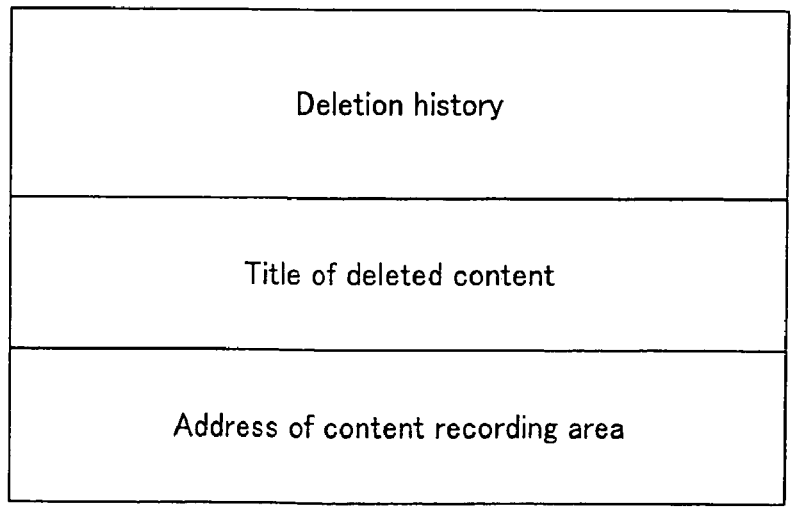

In the third method, both a recording history and deletion history are prepared. The recording history includes a field in which a medium ID is to be stated as shown in FIG. 15A. On the other hand, the deletion history includes fields for time of a deleted content, address of a recording area in which a content is recorded, etc. as shown in FIG. 15B. The medium ID is identification information having been recorded in a specific area at the time of manufacturing the MD 90. Here will be explained an example in which when the digital camera function of the MD recording player 1 is set up, audio data recorded under the protection of copyright is deleted to assure a sufficient capacity for recording captured picture data.

In the third method, only when a content in the recording history stored in the PC 200 and a content in the deletion history stored in the MD 90 by the MD recording player 1 are coincident in medium ID of the MD 90 with each other, the MD recording player 1 can re-record the deleted content to the MD 90.

Further in the third method, "deemed check-in and deemed check-out" can be effected. In the copyright protection technology for audio data, illegal copy of a content is prevented by limiting the number of times the content is checked out. In case a checked-out content is deleted at the check-out destination, however, the checked-out content will not exist and thus cannot be checked in. Thus, the number of times of check-out will remain counted in the PC 200. The "deemed check-in" is such that the number of times of checkout is limited by deeming content data actually checked out from the PC 200 to the MD recording player 1 a content not checked out, namely, by taking, with reference to the deletion history or recording history, content data whose substance has been deleted as having been checked in.

Figure 16:
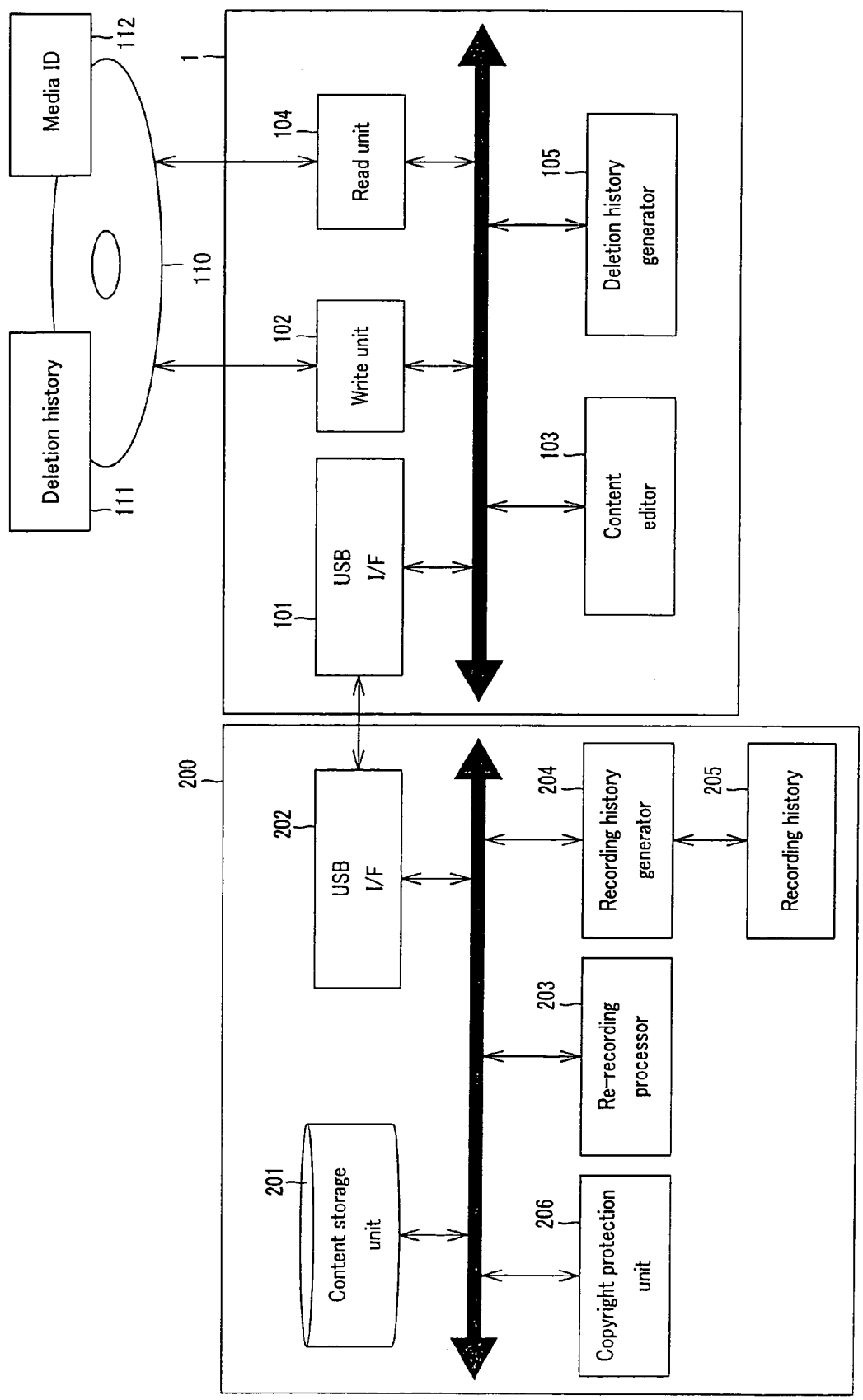
FIG. 16 shows functions of the PC and MD recording player, working together to carry out the third method.

FIG. 16 shows functional blocks of the PC 200 and MD recording player 1, for implementing the third method. For the third method, the PC 200 includes a recording history generator 204, and the MD recording player 1 includes a deletion history generator 105. Also, the MD recording player 1 has a medium ID recorded in the concealing area on the MD 90. The recording history will also include the medium ID for the MD recording player 1 as a recording destination (moving destination) of content data.

For the third method shown in FIG. 16, the PC 200 further includes a copyright protection unit 206. The copyright protection unit 206 limits the number of times a content is checked out, that is, number of copies. When a content recorded in the MD recording player 1 is deleted, the re-recording processor 203 decreases the number of times of check-out by one. Thus, it is possible to match a number of times of check-out given to the user with actual content data.

Figure 17A:
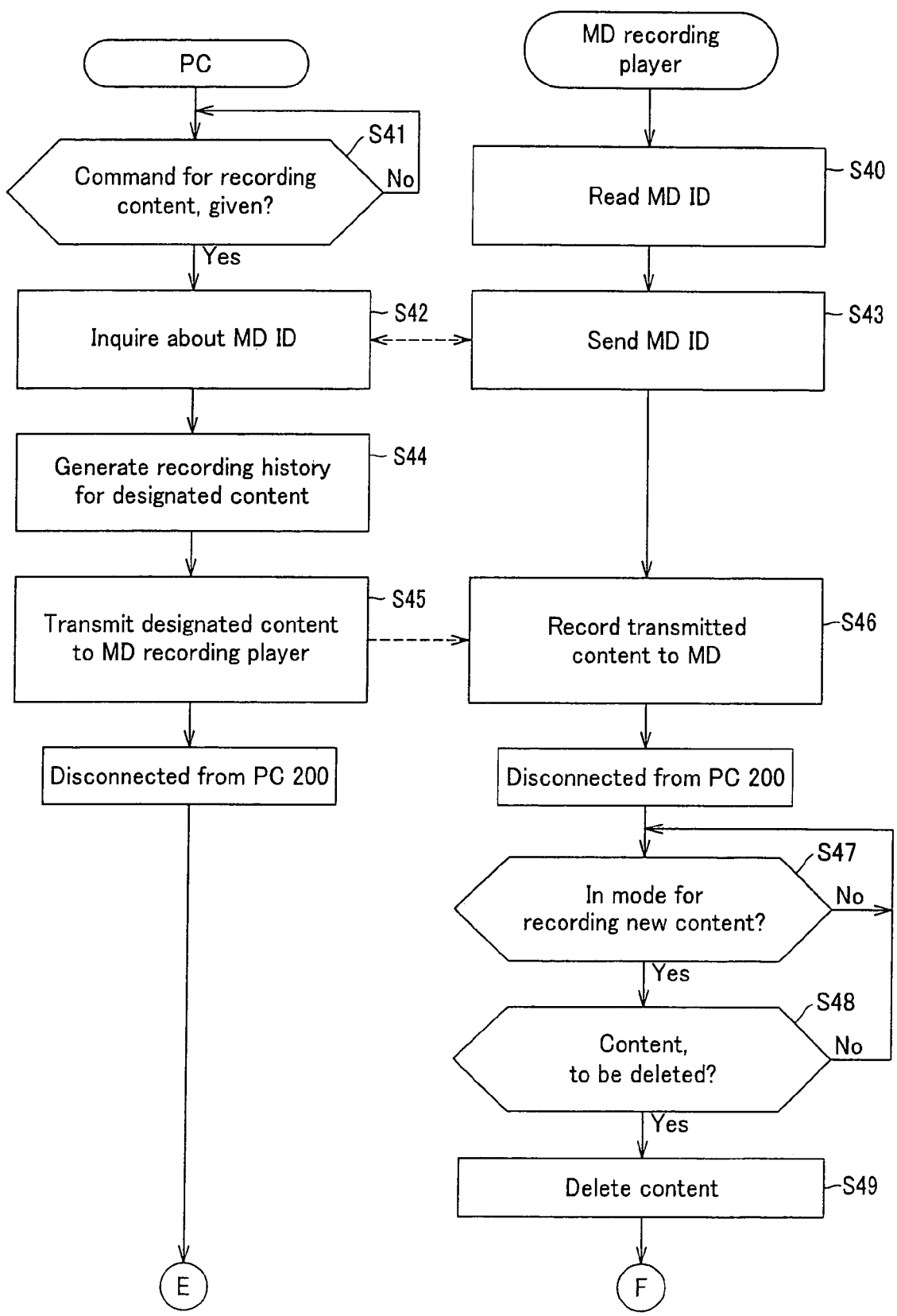
FIGS. 17A and 17B show steps of operation in restoration of a deleted content by the third method.
Figure 17B:
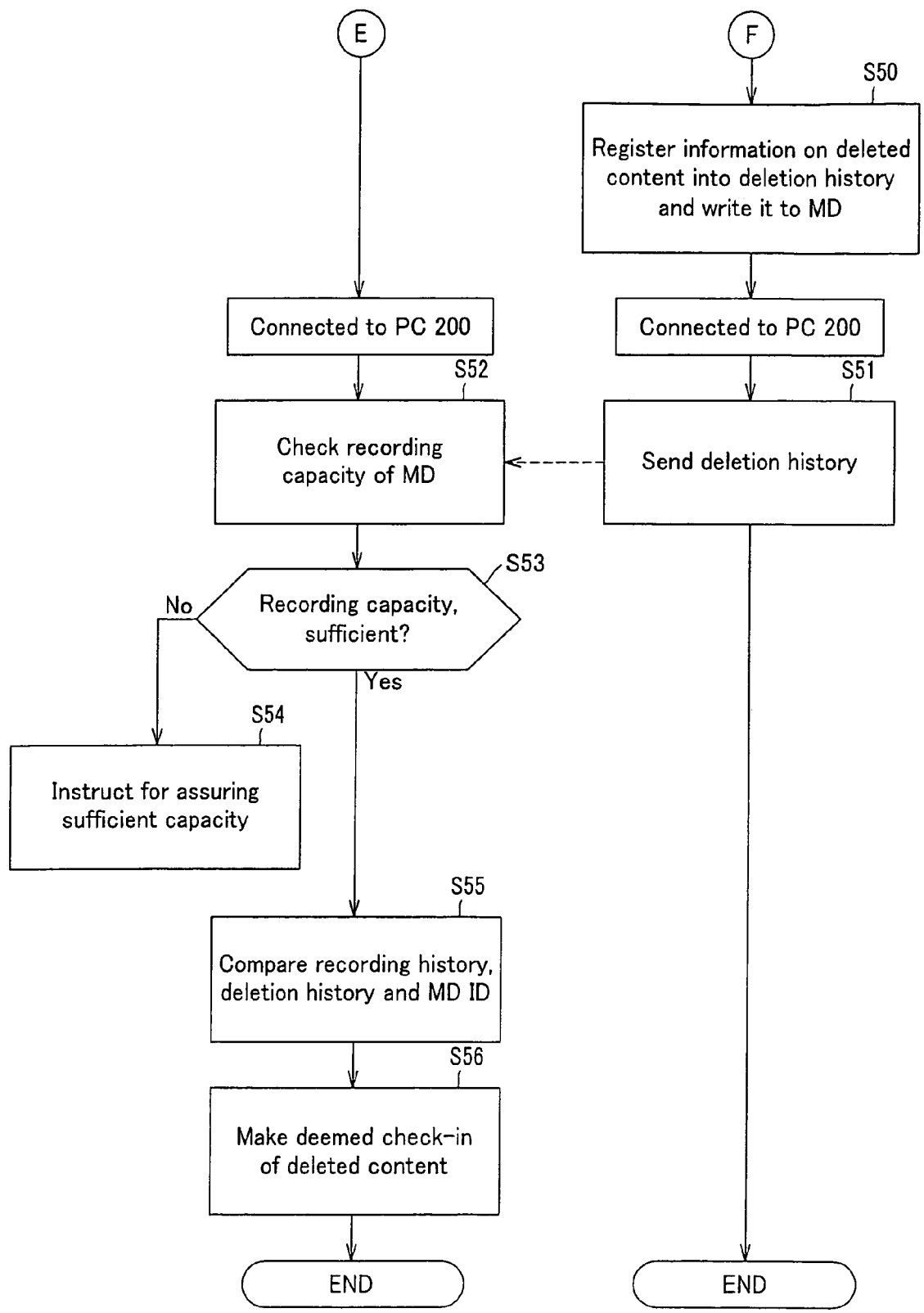

The restoration of a deleted content by the aforementioned third method will be explained below with reference to FIG. 17.

When loaded with an MD 90, the MD recording player 1 reads the medium ID of the MD 90 (in step S40). When the user instructs the PC 200 to record a content (YES in step S41), the PC 200 will inquire the MD recording player 1 of the medium ID of the MD 90 (in step S42). The MD recording player 1 sends the medium ID to the PC 200 (in step S43).

The recording history generator 204 in the PC 200 writes the medium ID of the MD recording player 1, identification information on the designated content, address of a recording area where the content is recorded, date of recording into the recording history (in step S44). Next, the recording history generator 204 transmits the designated audio data being a content stored in the content storage unit 201 to the MD recording player 1 (in step S45). The write unit 102 of the MD recording player 1 records the content supplied from the PC 200 to the MD 90 (in step S46).

For example, when the user selects a mode of operation for recording a new content (YES in step S47) while the MD recording player 1 is disconnected from the PC 200 and ready for independent use, the content editor 103 will judge whether further audio data recorded in the MD 90 should be deleted to assure a sufficient recording capacity for recording the additional content (in step S48). In this example, the digital camera function of the MD recording player 1 is selected and picture data as an additional content is recorded. For example, when deletion of audio data is selected (YES in step S48), the MD recording player 1 will delete designated audio data (in step S49), and record information on the deleted audio data to the deletion history (in step S50).

Then, when the MD recording player 1 is connected to the PC 200 next, it will send deletion history information to the PC 200 (in step S51). The PC 200 checks the recording capacity of the MD 90 (in step S52). If the recording capacity of the MD 90 is insufficient for making up for the deleted content (NO in step S53), the PC 200 will give the user an indication of an instruction for assuring a sufficient recording capacity of the MD 90 (in step S54). In case the recording capacity is sufficient (YES in step S54), the PC 200 makes a comparison between the recording history and deletion history and the medium ID of the Mini Disk (in step S55), and then makes deemed check-in of the deleted content (in step S56). That is, even if content data has the substance thereof deleted, matching the number of times of check-in and check-out with the content data assures the number of times of check-out even in case checked-out content data has been deleted for any reason at the check-out destination and makes it possible to prevent any inconvenience that the content data cannot be used.

Now, the operation of deleting a content recorded in the Mini Disk for new content data to be recorded, as in steps S4 to S6 in the first method and steps S47 to 49 in the third method, will be described in further detail with reference to FIG. 18.

Figure 18:
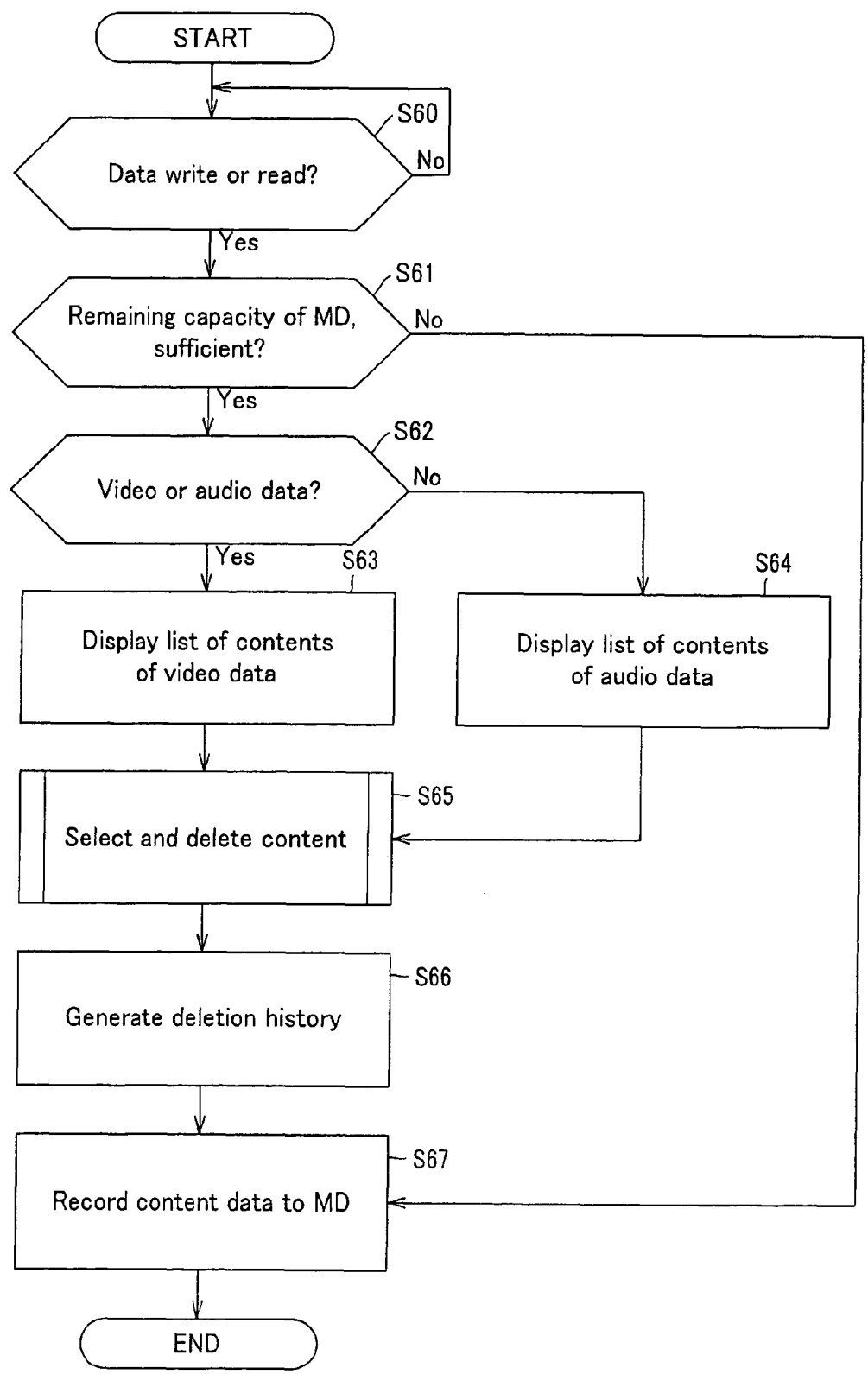
FIG. 18 shows steps of operation in the first and third methods for deleting a content recorded in the MD for content data newly recorded in the MD.

As shown in FIG. 18, the content editor 103 in the MD recording player 1 judges which is to be done, data write or read (in step S60). When the data is to be written, the content editor 103 will judge whether the recording capacity of the Mini Disk is sufficient for writing the data (in step S61). If the recording capacity is determined to be insufficient, the content editor 103 judges in which mode the content data is, audio or video (captured by the digital camera) (in step S62). When the content data is video data, the content editor 103 displays a list of video data recorded in the Mini Disk (in step S63). If the content data is audio data, the content editor 103 will display a list of audio data recorded in the Mini Disk (in step S64). According to an instruction selected by the user on the basis of the displayed information, the content editor 103 selects a content data and deletes it (in step S65). At this time, the content editor 103 displays a graphic-user interface for selection of whether the content data is to be deleted or not. The deletion history generator 105 will register content information on the deleted audio or video data to the deletion history. It prepares a deletion history, and the write unit 102 additionally writes new content data to the Mini Disk.

As having been described in the foregoing, with the aforementioned first to third methods as the embodiments of the present invention, the user has not to remember any deleted content data but the deleted content data is automatically restored based on the deletion or recording history. Also, even content data, whose move and copy between the devices or recording media are managed, deleted for any reason as in the check-in and check-out of audio data, can be restored for use by matching the management information on the deleted content data under the copyright protection.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

According to the present invention, a deleted content can be restored based on the deletion history without the necessity that the user himself should remember which the deleted content is. Also, even deleted content data, whose move and copy between the devices or recording media are managed, can be restored for use under the copyright protection. Also, in case a host device is available which can store contents, storage of the recording history of a content recorded in the recording medium into the host device permits to identify a deleted content based on the recording history and information on the content recorded in the recording medium.

The invention claimed is:

1. A content recording/reproducing apparatus for recording and/or reproducing content data including audio data, video data, or computer data to and/or from a recording medium having a recording area, in which main data is recorded, and a management area, in which data for managing the main data is recorded, the apparatus comprising:

recording/reproducing means for recording content data to the recording medium or reproducing content data from the recording medium;

operating means for receiving instructions to record or reproduce the content data to or from the recording medium;

editing means for editing, by one of deleting, copying, and reordering, information recorded in the recording area, in which the main data is recorded, and in the management area, in which the managing data is recorded, in response to a command received from the operating means;

deletion history generating means for generating deletion history information on the basis of information corresponding to the content data when the content data is deleted from the recording medium in response to the command received from the operating means, the deletion history information including identification information, address information of a recording area, and a time of deletion; and controlling means for controlling the deletion history generating means to generate the deletion history information when the content data recorded in the recording medium is deleted in response to the command received from the operating means and for recording the deletion history information to the recording medium.

2. The apparatus according to claim 1, further comprising connecting means for connecting to an information processor including storing means for storing content data, and for transferring the content data, wherein the controlling means further includes means for transmitting the deletion history information recorded in the recording medium to the information processor when the connecting means is connected to the information processor.

3. The apparatus according to claim 2, further comprising video data acquiring means for acquiring video data, wherein the controlling means further includes means for deleting, when the video data acquiring means acquires video data, a part of the content data recorded to the recording medium based on a recording capacity of the recording medium, and for controlling the deletion history generating means to generate deletion history information and record the deletion history information to the recording medium.

4. An information processing device including a storing means for storing content data and which is connected to an external device to transmit the stored content data to the external device, which records and reproduces the content data to and/or from a recording medium loaded in the external device, the information processing device comprising:

recording history generating means for generating recording history information on the basis of information corresponding to the content data obtained from the storing means by the external device when the content data is obtained by the external device, the recording history information including identification information, address information of a recording area, and a time of recording; and controlling means for comparing the content data stored in the recording medium, which the external device can record and reproduce when the information processing device is connected to the external device, and the recording history information to determine content data deleted from the recording medium, and for re-transmitting the deleted content data.

5. A content recording/reproducing system including an information processor that stores content data and which is connected to a content recording/reproducing apparatus that obtains the content data from a storing means of the information processor and records the obtained content data to a recording medium or transmits content data recorded in the recording medium to the storing means of the information processor, the content recording/reproducing apparatus comprising:

recording/reproducing means for recording content data to the recording medium, which has a recording area in which main data is recorded and a management area in which data for managing the main data is recorded, or for reproducing content data recorded in the recording medium;

operating means for receiving instructions to record or reproduce the content data to or from the recording medium;

editing means for editing, by one of deleting, copying, and reordering, information recorded in the recording area, in which the main data is recorded, and in the management area, in which the managing data is recorded, in response to a command received from the operating means;

deletion history generating means for generating deletion history information on the basis of information corresponding to the content data when the content data is deleted from the recording medium in response to the command received from the operating means, the deletion history information including identification information, address information of a recording area, and a time of deletion; and controlling means for controlling the deletion history generating means to generate the deletion history information when the content data recorded in the recording medium is deleted in response to the command received from the operating means, and for recording the deletion history information to the recording medium, wherein, when the information processor is connected to the content recording/reproducing apparatus, the information processor acquires the deletion history information recorded to the recording medium by the content recording/reproducing apparatus and re-transmits a deleted content on the basis of the deletion history information.

6. A content recording/reproducing system including an information processor that stores content data and a content recording/reproducing apparatus connected to the information processor that obtains content data from a storing means of the information processor and records the obtained content data to a recording medium or transmits content data recorded in the recording medium to the storing means of the information processor, the content recording/reproducing apparatus comprising:

recording/reproducing means for recording content data to the recording medium having a recording area, in which main data is recorded, and a management area, in which data for managing the main data is recorded, or for reproducing content data recorded in the recording medium;

operating means for receiving instructions to record or reproduce the content data to or from the recording medium; and editing means for editing, by one of deleting, copying, and reordering, information recorded in the recording area, in which the main data is recorded, and the management area, in which the managing data is recorded, in response to a command received from the operating means, wherein the information processor includes recording history generating means for generating recording history information on the basis of information corresponding to the content data obtained by the content recording/reproducing apparatus when the content recording/reproducing apparatus obtains content data from the storing means of the information processor, the recording history information including identification information, address information of a recording area, and a time of deletion, and, when the content recording/reproducing apparatus is connected to the information processor, the content recording/reproducing apparatus compares the content data recorded in the recording medium and the recording history information to determine content data deleted from the recording medium and requests the deleted content data from the information processor.

7. A content recording/reproducing method of recording and/or reproducing content data including audio data, video data, or computer data to and/or from a recording medium having a recording area, in which main data is recorded, and a management area, in which data for managing the main data is recorded, the method comprising:

recording content data to the recording medium or reproducing content data from the recording medium;

editing, by one of deleting, copying, and reordering, information recorded in the recording area in response to a command received from an operating means;

generating deletion history information on the basis of information corresponding to the content data when the content data is deleted from the recording medium in response to the command received from the operating means, the deletion history information including identification information, address information of a recording area, and a time of deletion; and recording the generated deletion history information to the recording medium.

8. A content recording/reproducing method of recording and/or reproducing content data in an information processing device including a storing means for storing content data and which is connected to an external device to transmit the stored content data to the external device, which records and reproduces content data to and/or from a recording medium loaded in the external device, the method comprising:

generating recording history information on the basis of information corresponding to the content data obtained from the storing means by the external device in response to the content data being obtained by the external device from the storing means, the recording history information including identification information, address information of a recording area, and a time of recording; and comparing the content data stored in the recording medium, which the external device can record and reproduce when the information processing device is connected to the external device, and the recording history information to determine content data deleted from the recording medium, and re-transmitting the deleted content data.

9. A content recording/reproducing method of recording and/or reproducing content data in a content recording/reproducing system including an information processor that stores content data and which is connected to a content recording/reproducing apparatus that obtains content data from a storing means of the information processor and records the obtained content data to a recording medium or transmits content data recorded in the recording medium to the storing means of the information processor, the method comprising:

generating deletion history information on the basis of information corresponding to the content data when the content data is deleted from the recording medium in response to a command received from an operating means, the deletion history information including identification information, address information of a recording area, and a time of deletion;

recording the generated deletion history information to the recording medium; and acquiring the deletion history information recorded to the recording medium when the information processor and the content recording/reproducing apparatus are connected to each other and re-transmitting content data determined to have been deleted from the recording medium on the basis of the deletion history information.

10. A content recording/reproducing method of recording/reproducing content data in a content recording/reproducing system including an information processing device that stores content data and which is connected to a content recording/reproducing apparatus that obtains content data from a storing means of the information processing device and records the content data to a recording medium or transmits content data recorded in the recording medium to the storing means of the information processing device, the method comprising:

generating recording history information on the basis of information corresponding to the content data obtained from the information processing apparatus by the content recording/reproducing apparatus in response to the content recording/reproducing apparatus obtaining content data from the information processing device, the recording history information including identification information, address information of a recording area, and a time of recording; and comparing the content data recorded in the recording medium and the recording history information to determine content data deleted from the recording medium when the content recording/reproducing apparatus is connected to the information processing device, and requesting the deleted content data from the information processing device.

11. A content recording/reproducing apparatus for recording and/or reproducing content data including audio data, video data, or computer data to and/or from a recording medium having a recording area and a management area, the apparatus comprising:

a recording/reproducing unit configured to record content data to the recording medium or to reproduce content data from the recording medium;

an operating unit configured to receive instructions to record or reproduce the content data to or from the recording medium;

an editing unit configured to edit, by one of deleting, copying, and reordering, information recorded in the recording area, in which main data is recorded, and the management area, in which managing data is recorded, in response to a command received from the operating unit;

a deletion history generating unit configured to generate deletion history information on the basis of information corresponding to the content data when the content data is deleted from the recording medium in response to the command received from the operating means, the deletion history information including identification information, address information of a recording area, and a time of deletion; and a controlling unit configured to control the deletion history generating unit to generate the deletion history information when the content data recorded in the recording medium is deleted in response to the command received from the operating unit and to record the deletion history information to the recording medium.

* * * * *